(12) United States Patent
Satou

(10) Patent No.: US 8,019,322 B2
(45) Date of Patent: Sep. 13, 2011

(54) USE LIMITING APPARATUS, KEY, AND USE LIMITING SYSTEM FOR ELECTRONIC EQUIPMENT

(75) Inventor: Yoshiyasu Satou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 998 days.

(21) Appl. No.: 11/912,130

(22) PCT Filed: Apr. 21, 2006

(86) PCT No.: PCT/JP2006/308463
§ 371 (c)(1),
(2), (4) Date: Oct. 19, 2007

(87) PCT Pub. No.: WO2006/115222
PCT Pub. Date: Nov. 2, 2006

(65) Prior Publication Data
US 2009/0036097 A1  Feb. 5, 2009

(30) Foreign Application Priority Data
Apr. 22, 2005 (JP) .................................. 2005-125156

(51) Int. Cl.
*H04M 1/66* (2006.01)
*H04M 1/68* (2006.01)
*H04M 3/16* (2006.01)
*H04B 7/00* (2006.01)
*G08B 13/14* (2006.01)

(52) U.S. Cl. ...... 455/411; 455/410; 455/41.2; 455/41.3; 340/568.1; 340/571; 340/572.2; 340/572.4

(58) Field of Classification Search ............... 307/10.2; 340/568.1, 571, 572.2, 572.4; 455/410, 411, 455/41.2, 41.3
See application file for complete search history.

(56) References Cited

U.S. PATENT DOCUMENTS

| 6,690,267 B2 * | 2/2004 | Linden et al. ............... 340/432 |
| 2001/0033228 A1 * | 10/2001 | Kisreman et al. ......... 340/568.1 |
| 2007/0187684 A1 * | 8/2007 | Koyama ....................... 257/66 |

FOREIGN PATENT DOCUMENTS

| JP | 07-231290 | | 8/1995 |
| JP | 08-084111 | | 3/1996 |
| JP | 11-088499 | | 3/1999 |
| JP | 2001-245354 | | 9/2001 |
| JP | 2001245354 A | * | 9/2001 |
| JP | 2002-271486 | | 9/2002 |
| JP | 2002-305584 | | 10/2002 |

* cited by examiner

*Primary Examiner* — Dwayne Bost
*Assistant Examiner* — Larry Sternbane
(74) *Attorney, Agent, or Firm* — Seed IP Law Group PLLC

(57) ABSTRACT

A use limiting system of electronic equipment capable of suppressing power consumption while preventing unauthorized use by other people by limiting the use in the case of theft or loss of electronic equipment is provided. A key 10 and a use limiting apparatus 20 built into a mobile telephone 1 start polling at predetermined polling intervals and also periodically check an operation state of the mobile telephone 1. When the mobile telephone 1 is in operation at that time, the polling interval of the key 10 and the use limiting apparatus 20 is increased from T1 to T2 and when the mobile telephone 1 is not in operation, the elapsed time from the nearest operation time is clocked by a timer and the polling interval is gradually decreased from T1 or T2 to T3-T5 according to the clocked time and the polling is performed.

16 Claims, 24 Drawing Sheets

USE LIMITING APPARATUS, KEY, AND USE LIMITING SYSTEM FOR ELECTRONIC EQUIPMENT

TECHNICAL FIELD

The present invention relates to a use limiting apparatus, a key and an electronic equipment capable of limiting the use in the case of theft or loss of various pieces of equipment such as a mobile telephone, a personal digital assistant or a personal computer.

BACKGROUND ART

In recent years, electronic equipment such as a mobile telephone, a PDA or a personal computer has become widely used as a communication unit and an information processing unit. However, with that, examples of theft or loss due to leaving etc. often occur and the risk of a leak of personal information such as a telephone book or unauthorized use by other people increases. Therefore, a technique for improving security becomes increasingly important.

An example of a use limiting apparatus of equipment constructed so as to include a mobile telephone 1 and a key 10 attached to these pieces of equipment and capable of being always carried by a user of the equipment and identification codes are mutually communicated (hereinafter called polling) and thereby, use limiting of the pieces of equipment 1 to 3 is released and when a mutual distance is separated at a predetermined distance or longer and a reception level reduces, release of the use limiting of the pieces of equipment 1 to 3 is stopped and the pieces of equipment are disabled and also an alarm signal is issued by a wireless communication unit (hereinafter called a key) 10 has been known conventionally (for example, see Patent Reference 1).

Patent Reference 1: JP-B-2931276

DISCLOSURE OF THE INVENTION

Problems that the Invention is to Solve

However, in the conventional use limiting apparatus of equipment described above, when a user loses the equipment 1 because of loss, theft, etc., the equipment cannot be used and also, an effect capable of speedily taking subsequent measures by immediately noticing that the equipment is lost by an alarm issued from the key 10 can be obtained, but there is a problem that frequent polling of the order of milliseconds is always performed between the equipment 1 and the key 10 and that results in an increase in power consumption and a life of a battery becomes short.

The invention has been implemented in view of the circumstances described above, and an object of the invention is to provide a use limiting apparatus, a key and an electronic equipment capable of suppressing power consumption without decreasing a security level while preventing unauthorized use by other people by limiting the use in the case of theft or loss of electronic equipment.

Means for Solving the Problems

A use limiting apparatus of the invention is a use limiting apparatus annexed to an electronic equipment, and is characterized by comprising a sending and receiving processing part for sending and receiving an authentication signal to and from a key attached to the electronic equipment, an operation frequency detection part for detecting operation frequency to the electronic equipment, and a polling interval control part for setting an authentication interval at which the authentication signal is sent to the sending and receiving processing part based on the operation frequency detected by the operation frequency detection part.

Also, a use limiting apparatus of the invention is a use limiting apparatus annexed to an electronic equipment, and is characterized by comprising a sending and receiving processing part for sending and receiving an authentication signal to and from a key attached to the electronic equipment, a signal level detection part for detecting a signal level of radio waves including the authentication signal received from the key by the sending and receiving processing part as information, an authentication processing part for determining whether or not a signal level detected by the signal level detection part is a predetermined threshold value or more, and determining whether or not a particular identification code is included in the authentication signal when the signal level detected by the signal level detection part is the predetermined threshold value or more, an operation frequency detection part for detecting operation frequency to the electronic equipment, a polling interval control part for setting an authentication interval at which the authentication signal is sent to the sending and receiving processing part based on the operation frequency detected by the operation frequency detection part, and an equipment use limiting signal generation part for generating an equipment use limiting signal for limiting use of the electronic equipment or releasing its limit according to a result of determination by the authentication processing part as a result of sending and receiving the authentication signal to and from the sending and receiving processing part at the authentication interval set by the polling interval control part.

Also, a use limiting apparatus of the invention is characterized in that the equipment use limiting signal generation part generates an equipment use limiting signal for limiting use of the electronic equipment when a signal level detected by the signal level detection part is less than a predetermined value.

Also, a use limiting apparatus of the invention is characterized in that the equipment use limiting signal generation part generates an equipment use limiting signal for limiting use of the electronic equipment when the authentication processing part determines that the particular code is not included in the case where a signal level detected by the signal level detection part is a predetermined threshold value or more.

A key of the invention is a key comprising a sending and receiving part for sending and receiving an authentication signal to and from a use limiting apparatus of the invention, and is characterized by comprising a polling interval control part for setting an authentication interval at which the authentication signal is sent to and received from the sending and receiving part to an authentication interval accepted from the use limiting apparatus by the sending and receiving part.

Also, a use limiting method of the invention is a use limiting for limiting use of the electric equipment for a period during which an authentication signal is sent to and received from a key and fails in authentication, and has the steps of detecting operation frequency to the electronic equipment, setting an authentication interval at which the authentication signal is sent based on the detected operation frequency, and sending the authentication signal every set authentication interval.

Also, a use limiting method of the invention is a use limiting method for limiting use of the electronic equipment for a period during which an authentication signal is sent to and received from a key and fails in authentication, and has a first detection step of detecting operation frequency to the electronic equipment, a setting step of setting an authentication interval at which the authentication signal is sent based on the detected operation frequency, a sending step of sending the authentication signal every set authentication interval, a receiving step of receiving the authentication signal from the key, a second detection step of detecting a signal level of radio waves including the authentication signal as information, a first determination step of determining whether or not a detected signal level is a predetermined threshold value or more, a second determination step of determining whether or not a particular identification code is included in the authentication signal when the detected signal level is the predetermined threshold value or more, and a control step of limiting use of the electronic equipment or releasing its limit according to determination results of the first determination step and the second determination step.

By this configuration, while preventing unauthorized use by other people by disabling the use in the case of theft or loss of electronic equipment, power consumption of a key and the electronic equipment can be suppressed as compared with the case of mutually communicating at the same intervals always.

Also, a use limiting apparatus of the invention is characterized in that the authentication processing part notifies the sending and receiving processing part of an authentication interval set by the polling interval control part.

By this configuration, while preventing unauthorized use by other people by disabling the use in the case of theft or loss of electronic equipment, a communication interval between a use limiting apparatus and a key can be changed simultaneously, so that power consumption of the key and the electronic equipment can be suppressed further.

Also, a use limiting apparatus of the invention is characterized in that the polling interval control part sets the authentication interval longer than a predetermined authentication time interval when an interval between a certain operation to the electronic equipment and the next operation is longer than a predetermined operation time interval, and sets the authentication interval shorter than a predetermined authentication time interval when an interval between a certain operation to the electronic equipment and the next operation is shorter than a predetermined operation time interval.

By this configuration, while preventing unauthorized use by other people by disabling the use in the case of theft or loss of electronic equipment, power consumption of a key and the electronic equipment can be suppressed as compared with the case of mutually communicating at the same intervals always.

Also, a use limiting apparatus of the invention is characterized in that the authentication processing part changes the predetermined threshold value according to operation frequency to the electronic equipment detected by the operation frequency detection part.

By this configuration, while preventing unauthorized use by other people by disabling the use in the case of theft or loss of electronic equipment, power consumption of a key and the electronic equipment can be suppressed as compared with the case of mutually communicating at the same intervals always.

Also, a use limiting apparatus of the invention is characterized by comprising an alarm part for giving a warning when an equipment use limiting signal for limiting use of the electronic equipment is generated by the equipment use limiting release signal generation part.

Also, a key of the invention is characterized by comprising a signal level detection part for detecting a signal level of radio waves including the authentication signal received from the electronic equipment by the sending and receiving processing part as information, an authentication processing part for determining whether or not a signal level detected by the signal level detection part is a predetermined threshold value or more, and determining whether or not a particular identification code is included in the authentication signal when the signal level detected by the signal level detection part is the predetermined threshold value or more, and an alarm part for giving a warning when the signal level detected by the signal level detection part becomes less than a predetermined value.

By this configuration, in the case of losing electronic equipment or a key, the loss can be noticed at once, so that a situation in which the electronic equipment cannot be used by the absence of the key can be avoided.

Also, electronic equipment of the invention comprises a use limiting apparatus of the invention.

Also, a mobile telephone of the invention comprises a use limiting apparatus of the invention.

Also, a use limiting system of the invention is constructed by a use limiting apparatus annexed to an electronic equipment of the invention and a key attached to the electronic equipment.

Also, a use limiting system of the invention is constructed by a use limiting apparatus annexed to an electronic equipment of the invention and a key of the invention.

By this configuration, while preventing unauthorized use by other people by disabling the use in the case of theft or loss of electronic equipment, power consumption of the electronic equipment can be suppressed as compared with the case of mutually communicating at the same intervals always.

Also, a use limiting system of the invention is characterized in that a sending and receiving processing part of the use limiting apparatus and a sending and receiving part of the key carry a particular identification code by half-duplex communication.

By this configuration, while preventing unauthorized use by other people by disabling the use in the case of theft or loss of electronic equipment, a communication interval between a use limiting apparatus and a key can be changed simultaneously and thereby, power consumption of the key and the electronic equipment can be suppressed further.

Effect of the Invention

According to the invention, a use limiting apparatus, a key and a use limiting system capable of suppressing power consumption while preventing unauthorized use by other people by limiting the use in the case of theft or loss of electronic equipment can be provided.

BRIEF DESCRIPTION OF THE DRAWINGS

FIG. 6(b) is a diagram showing an outline configuration in a use limiting system of a personal computer according to the first embodiment.

DESCRIPTION OF REFERENCE NUMERALS AND SIGNS

1 MOBILE TELEPHONE
10 KEY
20,21 USE LIMITING APPARATUS
108,208 SIGNAL LEVEL DETECTION PART
109,209 AUTHENTICATION PROCESSING PART
110,210,216 TIMER
111,211 IDENTIFICATION CODE MEMORY
112,212 ALARM CIRCUIT, ALARM CIRCUIT PART
113,225 AUTHENTICATION CONTROL PART
120,220 POLLING INTERVAL STORAGE PART
121 POLLING INTERVAL SETTING PART
130,230 WIRELESS PART
131,231 SENDING AND RECEIVING PART
213 KEY INPUT PART
214 KEY INPUT TIME STORAGE PART
215 OPERATION FREQUENCY DETECTION PART
217 POLLING INTERVAL CONTROL PART
218 POLLING INTERVAL SETTING STORAGE PART
219 EQUIPMENT USE LIMITING SIGNAL GENERATION PART
240 POLLING PROCESSING PART
50 MOBILE TELEPHONE FUNCTION PART
501 WIRELESS COMMUNICATION PART
502 WIRELESS COMMUNICATION CONTROL PART
503 KEY INPUT PART
504 VOICE INPUT-OUTPUT PART
100,200,505 ANTENNA
506 SENDING AND RECEIVING SWITCHING PART
507 RECEIVING PART

BEST MODE FOR CARRYING OUT THE INVENTION

In an embodiment of the invention, a mobile telephone is illustrated as electronic equipment whose use is limited in the case of theft or loss. An outline of a key, a use limiting apparatus and a use limiting system of the electronic equipment according to the invention will be first described.

Figure 1:
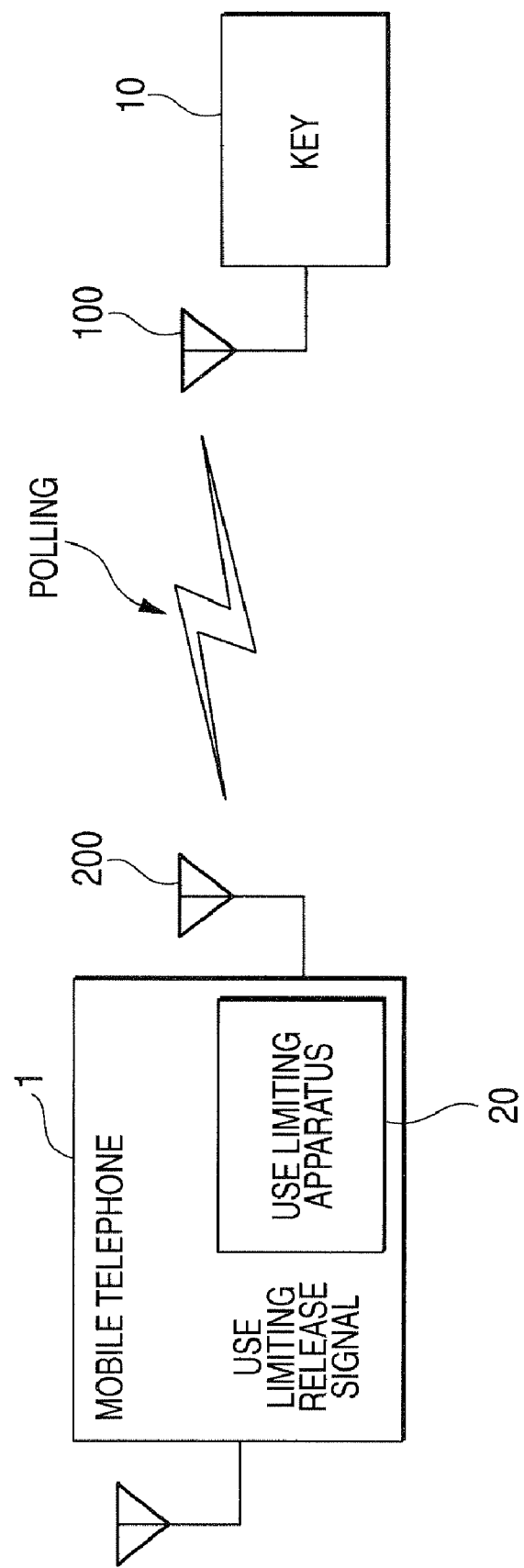
FIG. 1 is a diagram showing an outline configuration of a use limiting system of a mobile telephone according to an embodiment of the invention.

FIG. 1 is a diagram showing an outline configuration of a use limiting system in a mobile telephone. In the use limiting system of the mobile telephone according to the present embodiment, polling is performed between a use limiting apparatus 20 annexed to a mobile telephone 1 and a key 10 disposed independently through antennas 200, 100 using an UWB (Ultra Wide Band), radio waves, etc. for short-range communication in which a predefined identification code signal is used by RFID (Radio Frequency Identification). Or, polling in which weak radio waves are bi-directionally sent and received is performed.

The mobile telephone 1 is a mobile telephone obtained by building the use limiting apparatus 20 as use limiting means into a conventional general mobile telephone for conducting wireless communication with a base station through an antenna 300. In addition, the use limiting apparatus 20 may be configured to be mounted in the mobile telephone 1 using a connector or to be connected using a cable.

The key 10 has a form convenient to carry a card, a key, etc., and a user of the mobile telephone 1 puts the key 10 in a pocket, a bag, etc. and the key 10 is used within a predetermined range of distance from the mobile telephone 1 and polling is performed between the key 10 and the use limiting apparatus 20.

The use limiting apparatus 20 enables the use of the mobile telephone 1 by issuing a use limiting release signal to the mobile telephone 1 while polling is performed between the key 10 and the use limiting apparatus 20, and also prevents a leak of personal information such as a telephone book or unauthorized use by stopping the use limiting release signal and locking the mobile telephone 1 when a distance from the key 10 exceeds a predetermined range due to loss, theft, etc. and radio waves do not reach and the polling cannot be performed.

An action of the use limiting system in the mobile telephone 1 and a configuration of the key 10 and the use limiting apparatus 20 according to the embodiment will hereinafter be described using the drawings.

First Embodiment

Figure 2:
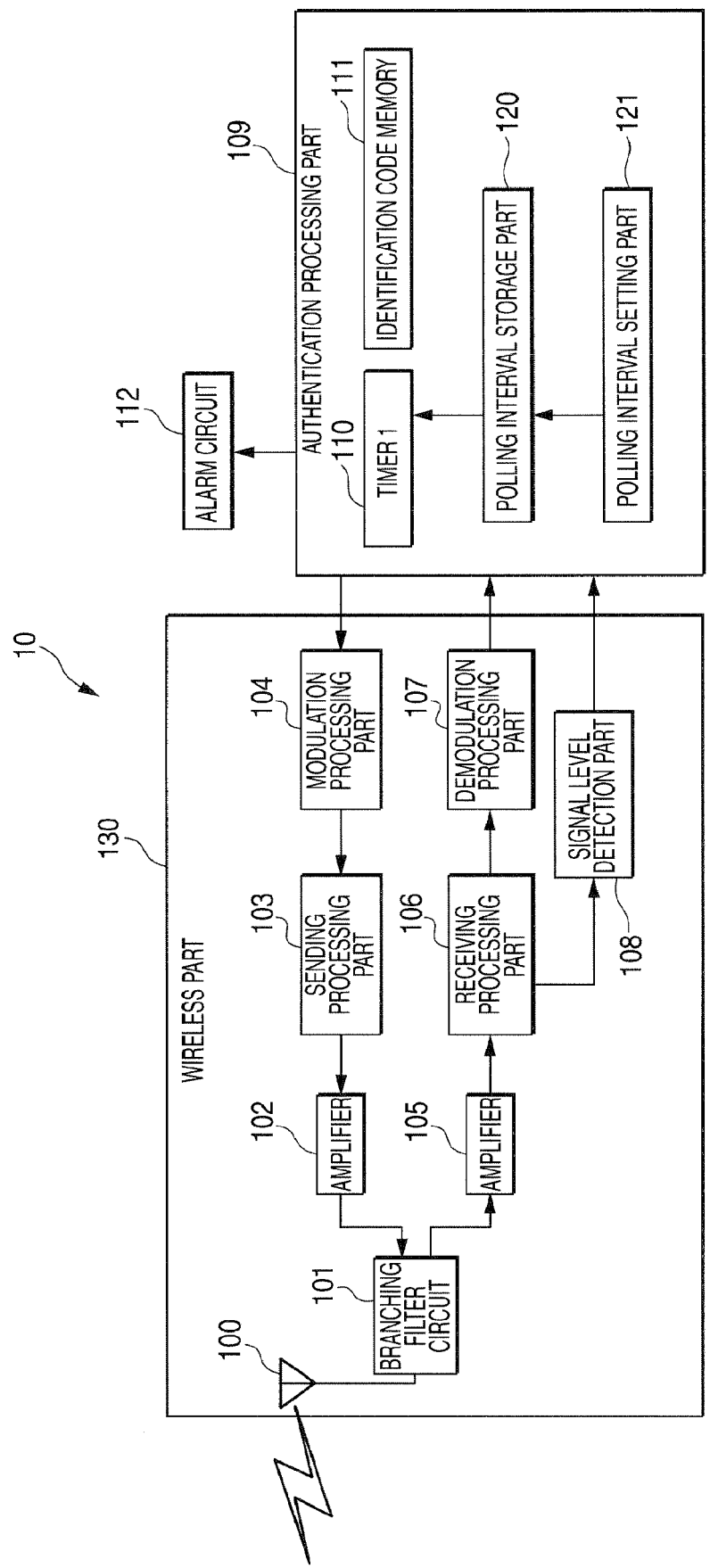
FIG. 2 is a diagram showing an outline configuration of a key according to a first embodiment of the invention.

FIG. 2 is a diagram showing an outline configuration of a key according to a first embodiment of the invention. As shown in the same diagram, the key 10 is configured to have a wireless part 130, an authentication processing part 109 and an alarm circuit 112.

The wireless part 130 is configured to have an antenna 100 for receiving radio waves sent from the use limiting apparatus 20 and also converting an authentication signal from an authentication processing part 209 into radio waves, a branching filter circuit 101 for switching the antenna 100 according to sending and receiving, an amplifier 105 for amplifying an electrical signal flowing through the antenna 100, a receiving processing part 106 for performing processing such as filtering of an electrical signal inputted from the amplifier 105 and outputting the electrical signal as a received signal, a demodulation processing part 107 for demodulating a received signal inputted from the receiving processing part 106, a signal level detection part 108 for detecting an electric field level of a carrier for carrying a received signal, a modulation processing part 104 for modulating and processing an electrical signal of a frequency used in wireless communication with the use limiting apparatus 20 based on an identification code signal sent, a sending processing part 103 for outputting a modulated electrical signal to an amplifier 102, and the amplification part 102 for performing electric power amplification of an electrical signal inputted from the sending processing part 103 and outputting its electrical signal to the antenna 100.

The authentication processing part 109 is configured to comprise a polling interval setting part 121 for setting an interval of polling (hereinafter called polling) for communicating a preset identification code unique to the key 10 with the use limiting apparatus 20, a polling interval storage part 120 for storing a set polling interval, a timer (1) 110 for clocking a polling interval, and an identification code memory 111 for storing an identification code.

Next, an action of the key 10 configured as described above will be described.

Every time the timer (1) 110 clocks a polling interval stored in the polling interval storage part 120, an identification code is read out of the identification code memory 111 and its identification code is outputted to the modulation processing part 104. The modulation processing part 104 modulates an electrical signal of a frequency used in wireless communication with the use limiting apparatus 20 based on the identification code, and the sending processing part 103 performs processing such as filtering of the modulated electrical signal and then, an electrical signal in which electric power amplification is performed by the amplifier 102 is emitted as radio waves from the antenna 100 through the branching filter circuit 101.

On the other hand, radio waves sent out of the use limiting apparatus 20 are received by the antenna 100 and the amplifier 105 amplifies the radio waves through the branching filter circuit 101 and then, the demodulation processing part 107 demodulates an electrical signal in which processing such as filtering is performed by the receiving processing part 106.

Also, a received signal processed by the receiving processing part 106 is outputted to the signal level detection part 108 and an intensity value (hereinafter called a received signal level) of its received signal is detected. It is determined whether or not the received signal level detected is a prescribed value or more in the authentication processing part 109, and it is decided whether or not a distance from the use limiting apparatus 20 is within a predetermined range based on its determination result. Then, when the received signal level is less than the prescribed value, it is decided that the key 10 is separate from the use limiting apparatus 20 at longer than a predetermined distance, and a warning signal is outputted in the alarm circuit 112. On the other hand, when the received signal level is the prescribed value or more, the authentication processing part 109 determines whether or not a demodulated identification code matches with an identification code stored in the identification code memory 111, and when the demodulated identification code does not match with the identification code, a warning signal is outputted in the alarm circuit 112 and when the demodulated identification code matches with the identification code, an authentication action is continued.

In addition, when information to the effect that setting of a polling interval is changed in the received signal is included in data demodulated by the demodulation processing part 107, a polling interval stored in the polling interval storage part 120 is rewritten to a set value specified from the use limiting apparatus 20 in the polling interval setting part 121.

Figure 3:
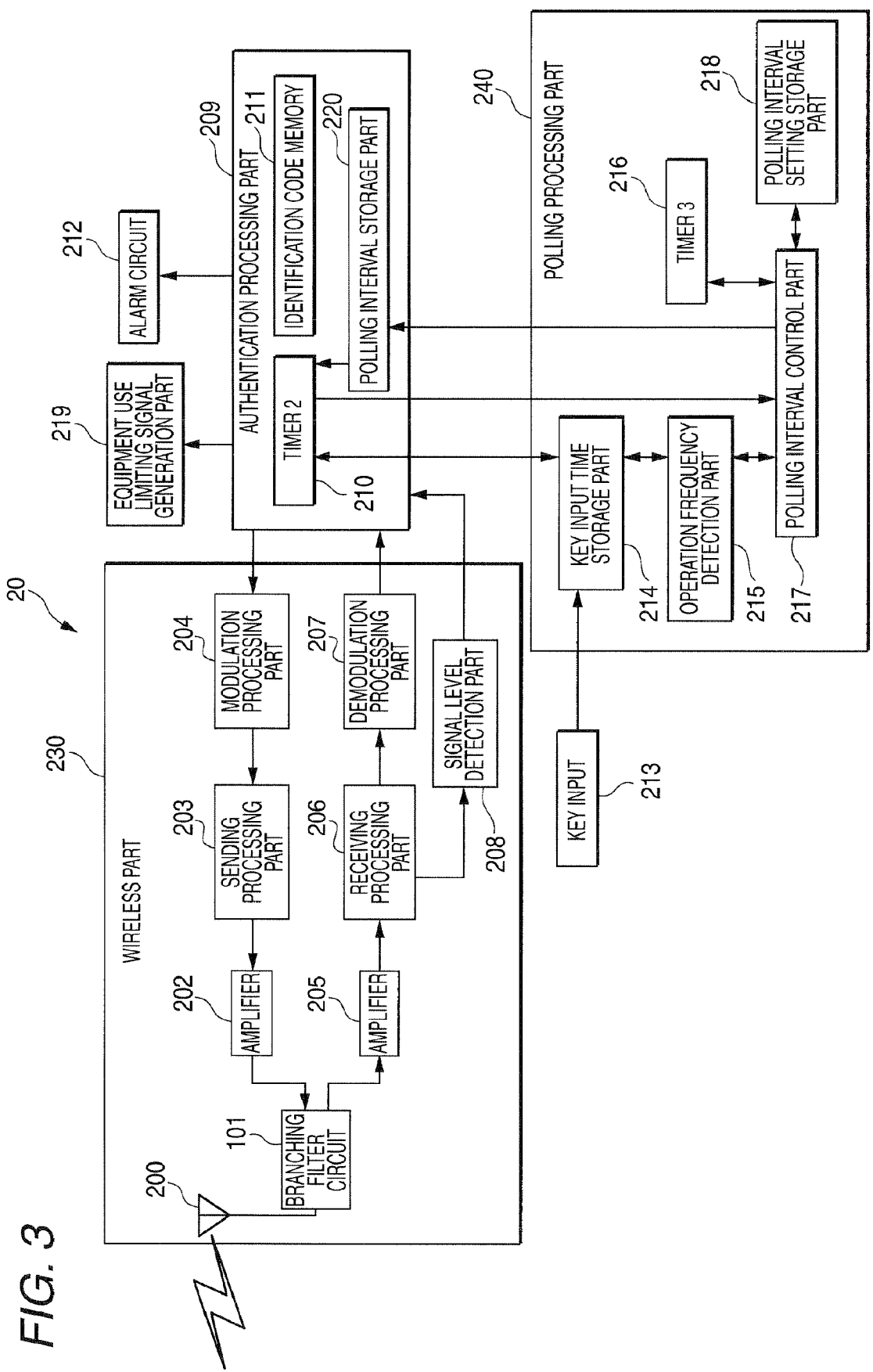
FIG. 3 is a diagram showing an outline configuration of a use limiting apparatus according to the first embodiment of the invention.

FIG. 3 is a diagram showing an outline configuration of the use limiting apparatus 20 according to the first embodiment of the invention. As shown in the same diagram, the use limiting apparatus 20 is configured to have a wireless part 230, a key input part 213 for detecting an action of an operation key of the mobile telephone 1, a polling processing part 240, an authentication processing part 209, an equipment use limiting signal generation part 219 and an alarm circuit 212.

Each part constructing the wireless part 230 has the same functions as those of the same names among the function parts constructing the wireless part 130 in the key 10. Because of this, description is omitted herein.

The polling processing part 240 is configured to comprise a key input time storage part 214 for storing the time which a timer (2) 210 clocks when a key operation to the mobile telephone 1 is detected by the key input part 213, an operation frequency detection part 215 for checking whether or not an operation to the mobile telephone 1 is performed by referring to the presence or absence of the time stored in the key input time storage part 214 periodically, a timer (3) 216 for starting clocking in the case of detecting that the operation to the mobile telephone 1 is performed as a result of the check processing by the operation frequency detection part 215, a polling interval setting storage part 218 for storing an interval of polling for communicating with the key 10, and a polling interval control part 217 for deciding a polling interval based on the time clocked by the timer (3) 216 and a polling interval stored in the polling interval setting storage part 218.

The authentication processing part 209 is configured to have a polling interval storage part 220 for storing a polling interval decided by the polling interval control part 217, the timer (2) 210 for clocking the elapsed time from the previous polling, and an identification code memory 211 for storing a preset identification code unique to the use limiting apparatus 20.

Next, an action of the use limiting apparatus 20 configured as described above will be described.

The operation frequency detection part 215 checks whether or not an operation to the mobile telephone 1 is performed by referring to the presence or absence of the time stored in the key input time storage part 214 periodically, and in the case of detecting that the operation to the mobile telephone 1 is performed as a result of the check processing by the operation frequency detection part 215, the polling interval control part 217 is notified of that effect. When notification from the operation frequency detection part 215 is accepted, the polling interval control part 217 makes the timer (3) 216 start clocking, and properly adjusts a polling interval according to the time taken to be notified that the operation to the mobile telephone 1 is not performed from the operation frequency detection part 215, and stores its polling interval in the polling interval storage part 220.

When the elapsed time clocked by the timer (2) 210 matches with a polling interval stored in the polling interval setting storage part 220 or exceeds the polling interval, the authentication processing part 209 reads an identification code out of the identification code memory 211 and outputs its identification code to a modulation processing part 204. The modulation processing part 204 modulates an electrical signal of a frequency used in wireless communication with the key 10 based on the identification code, and a sending processing part 203 performs processing such as filtering of the modulated electrical signal and then, an electrical signal in which electric power amplification is performed by an amplifier 202 is emitted as radio waves from an antenna 200 through a branching filter circuit 101.

On the other hand, radio waves sent out of the key 10 are received by the antenna 200 and an amplifier 205 amplifies the radio waves through the branching filter circuit 101 and then, a demodulation processing part 207 demodulates an electrical signal in which processing such as filtering is performed by a receiving processing part 206, and extracts an identification code. The authentication processing part 209 determines whether or not the demodulated identification code matches with an identification code stored in the identification code memory 211, and when the demodulated identification code does not match with the identification code, the use limit release signal generation part 219 stops an output of a use limiting release signal and use of the mobile terminal 1 is disabled and also a warning signal is outputted by the alarm circuit 212.

Also, a received signal processed by the receiving processing part 206 is outputted to a signal level detection part 208 and an intensity value (hereinafter called a received signal level) of its received signal is detected. It is determined whether or not the received signal level detected is a prescribed value or more in the authentication processing part 209, and it is decided whether or not a distance from the key 10 is within a predetermined range based on the determination result. Then, when the received signal level is the prescribed value or less, it is decided that the key 10 is separate at longer than a predetermined distance, and a warning signal is outputted in the alarm circuit 212.

In addition, the warning notified in the alarm circuit 212 is a warning obtained by sounding a speaker for a telephone call normally mounted in the mobile telephone 1. Also, means for displaying a warning on a display device such as an LED or liquid crystal may be used.

Figure 4:
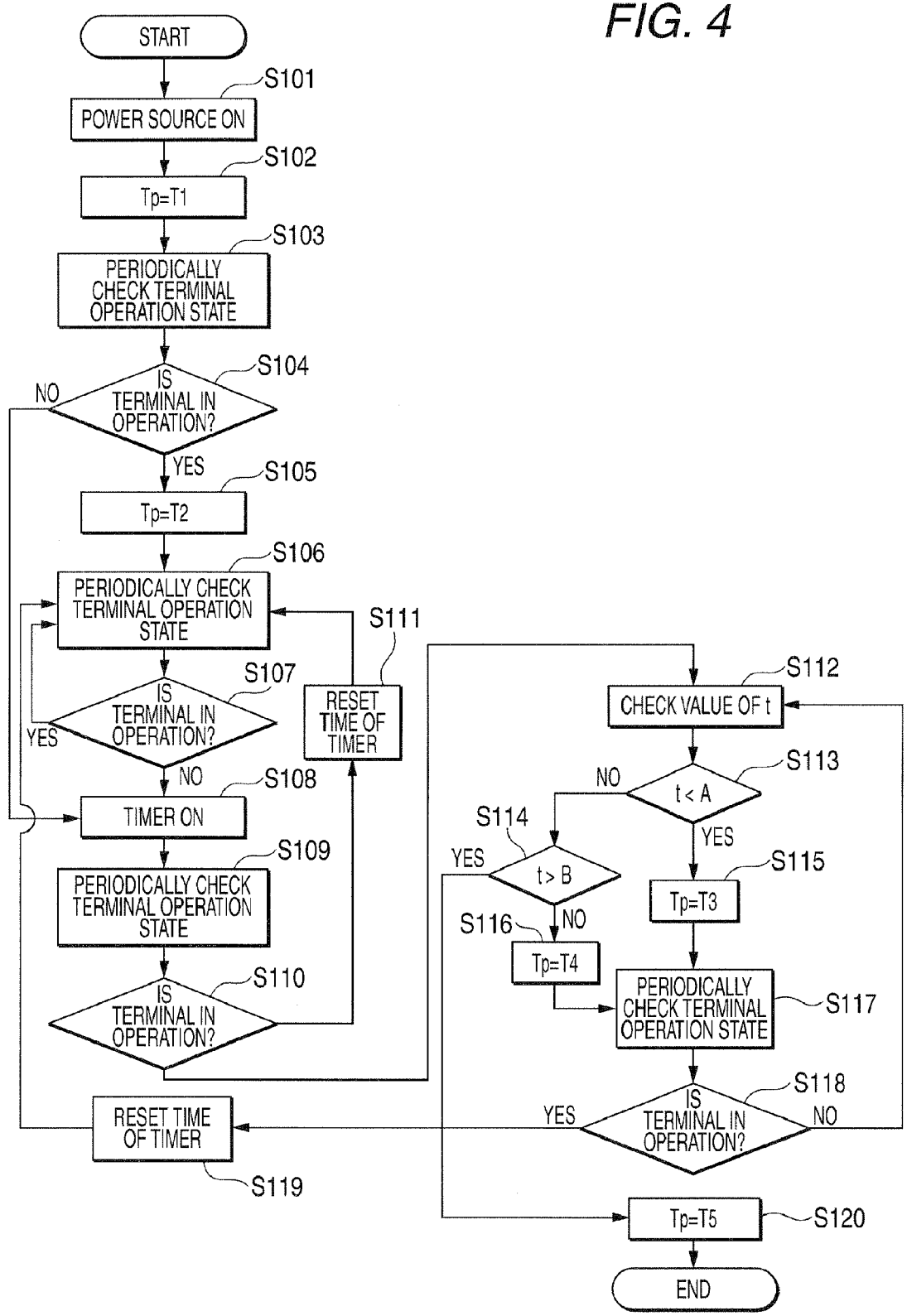
FIG. 4 is a flowchart describing an action procedure of a use limiting system of a mobile telephone according to the first embodiment of the invention.

Next, an action of the use limiting system according to the embodiment configured as mentioned above will be described. FIG. 4 is a flowchart describing an action procedure of the use limiting system of the mobile telephone 1 in the embodiment.

First, when a power source of the mobile telephone 1 is turned on in step S101, the use limiting apparatus 20 sets a polling interval Tp to be stored in the polling interval storage part 220 by the polling interval control part 217 at an initial value T1, and respectively starts polling through the wireless part 230 at the polling intervals T1 (step S102).

Figure 17:
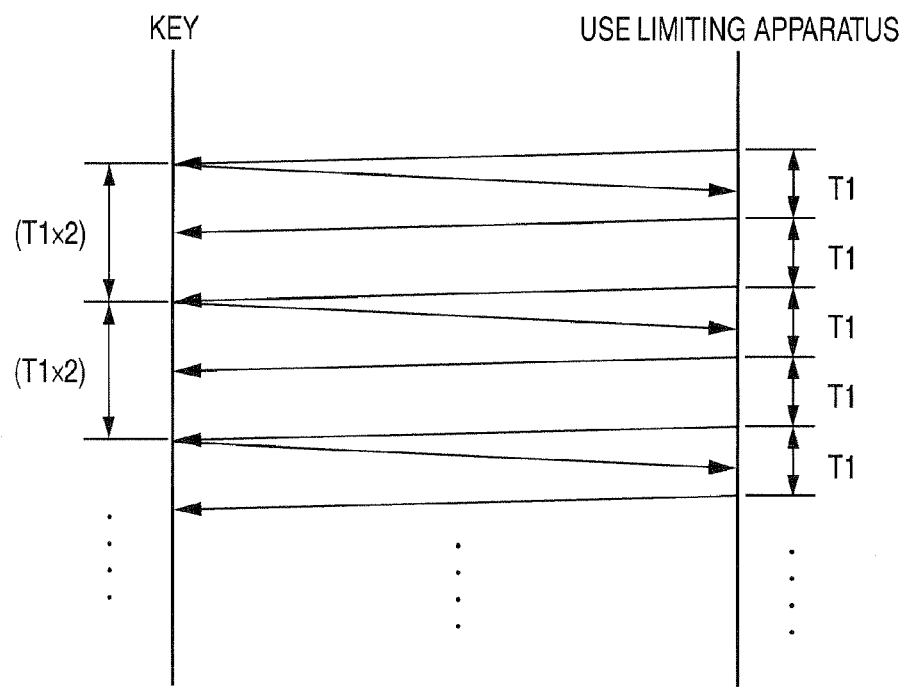
FIG. 17 is a sequence diagram of the case where a use limiting apparatus performs polling with respect to a key and the key accepting its polling responds.

FIG. 17 shows a sequence diagram of the case where the use limiting apparatus 20 performs polling with respect to the key 10 at the polling intervals T1 and the key 10 accepting its polling responds. FIG. 17 shows the case where the key 10 responds in a period (for example, (T1multiplied by 2) seconds) of an integral multiple (2 or more) of periodic polling (for example, T1 seconds) from the use limiting apparatus 20. Every time the key 10 accepts periodic polling from the use limiting apparatus 20, the key 10 may respond to its polling, but electric power consumed by the key 10 can be reduced by sending back a response every time the key 10 accepts the polling twice as shown in FIG. 17.

Subsequently, the operation frequency detection part 215 of the use limiting apparatus 20 periodically refers to the key input time storage part 214 (step S103), and determines whether or not the mobile telephone 1 is in operation depending on whether or not key input time is newly added as compared with the previous reference (step S104). As a result of that, when the mobile telephone 1 is in operation, the polling interval T1 stored in the polling interval storage part 220 is rewritten to T2 longer than T1 by the polling interval control part 217 and polling is performed between the key 10 and the use limiting apparatus 20 at the newly rewritten polling intervals T2 (step S105).

Then, the operation frequency detection part 215 again refers to the key input time storage part 214 by the terminal action check part 215 of the use limiting apparatus 20 (step S106), and determines whether or not the mobile telephone 1 is periodically operated (step S107), and when the mobile telephone 1 is in operation, the flowchart returns to the procedure of step S106 and similar processing is repeated.

On the other hand, when the operation frequency detection part 215 determines that the key input time is not added newly as compared with the previous reference and the mobile telephone 1 is not in operation in step S104 and step S107, the polling interval control part 217 activates the timer (3) 216 and starts clocking of elapsed time t from the end of the nearest operation of the mobile telephone 1 (step S108).

Subsequently, the operation frequency detection part 215 again periodically refers to the key input time storage part 214 and checks an operation state of the mobile telephone 1 (step S109), and determines whether or not the mobile telephone 1 is in operation (step S110). When the mobile telephone 1 is in operation as a result of the determination, the polling interval control part 217 resets the timer (3) 216 (step S11) and the flowchart returns to the procedure of step S106 and subsequent processing is repeated.

On the other hand, when the operation frequency detection part 215 determines that the mobile telephone 1 is not in operation in the procedure of step S110, the polling interval control part 217 checks a value of clocking t of the timer (3) 216 (step S112) and compares the value with a first prescribed value A for condition change and determines its large or small (step S113). Then, when t<A is satisfied, the polling interval Tp stored in the polling interval storage part 220 is rewritten from T2 to T3 by the polling interval control part 217 (S115) and polling to the key 10 is performed at intervals of T3. Here, T3 is arbitrary time shorter than T2.

Subsequently, the operation frequency detection part 215 checks an operation state of the mobile telephone 1 by periodically referring to the key input time storage part 214 (step S117), and determines whether or not the mobile telephone 1 is in operation (step S118). When the mobile telephone 1 is in operation as a result of that, based on control of the polling interval control part 217, the timer (3) 216 is reset (step S119) and the flowchart returns to the procedure of step S106 and subsequent processing is repeated.

On the other hand, when the operation frequency detection part 215 determines that the mobile telephone 1 is not in operation as a result of the determination in step S118, the polling interval control part 217 returns to the procedure for checking a value of clocking t of the timer (3) 216 in step S112 and subsequent processing is repeated.

Also, when the polling interval control part 217 determines that t<A is not satisfied in step S113, the polling interval control part 217 subsequently makes a comparison with a second prescribed value B for condition change and determines whether or not t>B is satisfied (step S114). When t<A is not satisfied and t>B is satisfied as a result of the determination, the polling interval control part 217 rewrites the polling interval Tp stored in the polling interval storage part 220 from T2 to T5(S120) and polling to the key 10 is performed. Here, T5 is time shorter than T2.

On the other hand, when t>B is not satisfied as a result of the determination in step S114, the polling interval control part 217 rewrites the polling interval Tp stored in the polling interval storage part 220 from T2 to T4(S116), and proceeds to the processing procedure of step S117, and periodically checks an operation state of the mobile telephone 1. Here, T2 to T5 are arbitrary times having a relation of T2 >T3>T4>T5. Thus, while an operation to the mobile telephone is detected, a polling interval is set long and while an operation to the mobile telephone cannot be detected, a polling interval is set short according to the elapsed time since the latest operation to the mobile telephone was detected and thereby, power consumption of the mobile telephone 1 can be reduced as compared with the case of performing polling at the same intervals always. Further, since the fact that a key operation of the mobile telephone 1 can be performed means that mutual authentication already holds at that point in time, a user of the mobile terminal 1 can decide that the said person is operating, so that even when an authentication interval during the key operation is made longer than that of the case of non-operation, a security level is not decreased and a life of a battery can be increased.

In the embodiment, values capable of being used as the polling time interval Tp have been set at five levels of T1, T2, T3, T4 and T5, but may be set at six levels or more as necessary. Also, A and B have been prescribed as the prescribed values about the elapsed time t since the mobile telephone 1 ended an operation, but prescribed values such as A, B, . . . , Z, AA, AB, . . . , AZ, BA, BB, . . . BZ may be increased as necessary.

Further, the polling time interval Tp which is a value of the polling storage part 220 has been rewritten to T1, T2, T3, T4 and T5 sequentially according to a flow from power-on or a value of t, but as other methods, the case of remaining T1 in step S105 or the case of omitting the procedure of S116 and proceeding to step S120 when t>A is satisfied can also be used.

Also, in the embodiment, the polling interval control part 217 has decided a polling interval by clocking the elapsed time from the end time of the nearest operation of the mobile telephone 1 by the timer (3) 216, but it may be constructed so that several near key-in times back in the past are stored and based on the times, the average operation time interval is calculated to decide a polling interval.

Further, time synchronized by the GPS etc. can also be used as the timer (1) 110. Also, antennas may be installed separately for sending and receiving.

In addition, when a distance between the mobile telephone 1 and the key 10 exceeds a predetermined distance and thereby a reception signal level detected by the signal level detection part 108, 208 reduces while performing any processing described above, an output of a use limiting release signal is stopped by the equipment use limiting signal generation part 219 of FIG. 3 and also a warning signal is outputted by the alarm circuit 112, 212.

Figure 5:
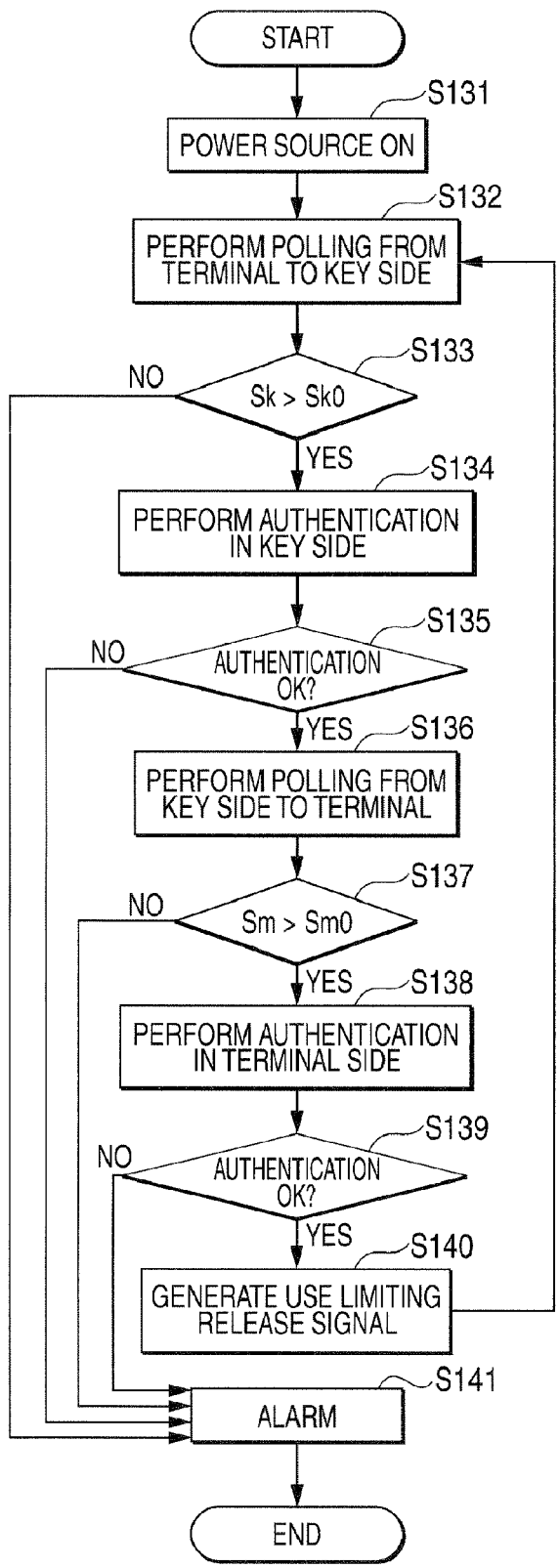
FIG. 5 is a flowchart describing a procedure for controlling a use limiting release signal in the use limiting system of the mobile telephone according to the first embodiment of the invention.

An action aspect in which a distance between the use limiting apparatus 20 and the key 10 is detected by detecting a reception signal level at the time of polling to the key 10 and an output of a use limiting release signal from the use limiting release generation part 219 is controlled will be described herein. FIG. 5 is a flowchart describing an action procedure.

First, when a power source is turned on by a user of the mobile telephone 1 (step S131), polling is started from the use limiting apparatus 20 to the key 10 (step S132).

FIG. 17 shows a sequence diagram of the case where the use limiting apparatus 20 performs polling with respect to the key 10 at polling intervals T1 and the key 10 accepting its polling responds. FIG. 17 shows the case where the key 10 responds in a period (for example, (T1 multiplied by 2) seconds) of an integral multiple (2 or more) of periodic polling (for example, T1 seconds) from the use limiting apparatus 20. Every time the key 10 accepts periodic polling from the use limiting apparatus 20, the key 10 may respond to its polling, but electric power consumed by the key 10 can be reduced by sending back a response every time the key 10 accepts the polling twice as shown in FIG. 17.

The key 10 receives a polling signal sent from the use limiting apparatus 20 by the wireless part 130, and the signal level detection part 108 detects a received signal level Sk. Then, the authentication processing part 109 notified of the detected received signal level Sk determines whether or not the received signal level Sk is larger than a prescribed value Sk0 (step S133). When the received signal level Sk is smaller than the prescribed value Sk0 as a result of that, the flowchart skips to step S141 and the alarm circuit 112 is driven to output a warning signal and the user of the mobile telephone 1 is warned that the mobile telephone 1 is separate at a predetermined distance or longer.

On the other hand, when the received signal level Sk is larger than the prescribed value Sk0 as a result of the determination in step S133, the authentication processing part 109 subsequently collates an identification code of the mobile telephone 1 included in a received signal with an identification code stored in the identification code memory 111 (step S134) and determines whether or not the identification codes match (step S135).

When the identification codes do not match as a result of the determination, the authentication processing part 109 skips to step S141 and outputs a warning signal from the alarm circuit 112 and warns the user of the mobile telephone 1 that the mobile telephone is not the mobile telephone 1 corresponding to the key 10. In addition, when the identification codes do not match in the processing of step S135, it may be constructed so as to return to step S132 and again wait for polling from the use limiting apparatus 20.

On the other hand, when the identification codes match as a result of the authentication determination in step S135 and authentication is performed, the authentication processing part 109 performs polling from the key 10 to the use limiting apparatus 20 of the mobile telephone 1 (step S136).

The use limiting apparatus 20 receives a polling signal sent from the key 10 by the wireless part 230, and the signal level detection part 208 detects a received signal level Sm. Then, the authentication processing part 209 notified of the detected received signal level Sm determines whether or not the received signal level Sm is larger than a prescribed value Sm0 (step S137). When the received signal level Sm is smaller than the prescribed value Sm0 as a result of that, the flowchart skips to step S141 and a warning signal is outputted from the alarm circuit 212 and the user of the mobile telephone 1 is notified that the mobile telephone 1 is separate at a predetermined distance or longer.

Figure 16:
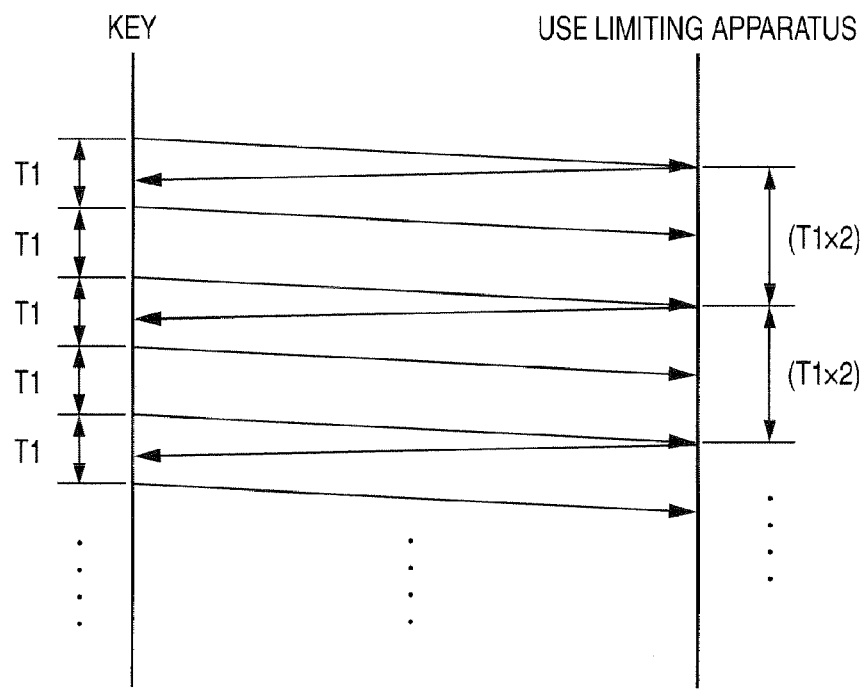
FIG. 16 is a sequence diagram of the case where a key performs polling with respect to a use limiting apparatus and the use limiting apparatus accepting its polling responds.

FIG. 16 shows a sequence diagram of the case where the key 10 performs polling with respect to the use limiting apparatus 20 at polling intervals T1 and the use limiting apparatus 20 accepting its polling responds. FIG. 16 shows the case where the use limiting apparatus 20 responds in a period (for example, (T1 multiplied by 2) seconds) of an integral multiple (2 or more) of periodic polling (for example, T1 seconds) from the key 10. Every time the use limiting apparatus 20 accepts periodic polling from the key 10, the use limiting apparatus 20 may respond to its polling, but electric power consumed by the use limiting apparatus 20 and the mobile telephone 1 can be reduced by sending back a response every time the use limiting apparatus 20 accepts the polling twice as shown in FIG. 16.

On the other hand, when the received signal level Sm is larger than the prescribed value Sm0 as a result of the determination in step S137, the authentication processing part 209 subsequently collates an identification code of the key 10 included in a received signal with an identification code stored in the identification code memory 211 (step S138) and determines whether or not the identification codes match (step S139).

When the identification codes do not match as a result of the authentication determination, the authentication processing part 209 skips to step S141 and outputs a warning signal from the alarm circuit 212 and warns the user of the mobile telephone 1 that there is not the mobile telephone 1 corresponding to the key 10.

On the other hand, when the identification codes match as a result of the collation determination in step S139 and authentication is performed, the authentication processing part 209 generates a use limiting release signal by the use limiting release signal generation part 219 and notifies a body of the mobile telephone 1 (step S140). Consequently, the mobile telephone 1 becomes an operable state. Thereafter, the flowchart returns to the procedure of step 202 and subsequent processing is repeated.

In accordance with such a use limiting system of the first embodiment according to the invention as described above, the key 10 and the use limiting apparatus 20 built into the mobile telephone 1 start polling intermittently at predetermined time intervals T1 and also periodically check an operation state of the mobile telephone 1. Then, when the mobile telephone 1 is in operation, the interval of polling to the key 10 is increased from T1 to T2 and when the mobile telephone 1 is not in operation, the elapsed time from the nearest operation time is clocked by the timer (3) and the polling interval is gradually decreased from T1 or T2 to T3-T5 according to the clocked time and the polling is continued.

Consequently, power consumption of the mobile telephone 1 can be reduced as compared with the case of performing polling at the same intervals always. Further, since the fact that a key operation of the mobile telephone 1 can be performed means that mutual authentication already holds at that point in time, a user of the mobile terminal 1 can decide that the said person is operating, so that even when an authentication interval during the key operation is made longer than that of the case of non-operation, a security level is not decreased and a life of a battery can be increased.

Also, received signal levels of polling are detected in both of the key 10 and the use limiting apparatus 20 and are compared with a prescribed value and when the signal levels do not meet the prescribed value, a warning signal is outputted and thereby, a user of the mobile telephone 1 can be notified that the mobile telephone 1 is separate from the key 10 at a predetermined distance or longer. Also, an identification code included in a received signal of polling is collated with an identification code unique to the mobile telephone 1 and the key 10 stored previously and when the identification codes do not match, a warning signal is outputted and thereby, a warning that the key 10 does not coincide with the mobile telephone 1 can be given.

Further, only when a received signal level of polling satisfies a prescribed value and an identification code is authenticated, a use limiting release signal is generated and the mobile telephone 1 is changed to an operable state and thereby, in the case of theft or loss of electronic equipment, its use can be limited to prevent unauthorized use of the mobile telephone 1 by other people.

Second Embodiment

A configuration of a key 10 and a use limiting apparatus 20 according to a second embodiment of the invention is the same as that of the first embodiment respectively shown in FIGS. 2 and 3, and in the use limiting system of the mobile telephone 1 according to the first embodiment, a function of notifying the key 10 of a polling interval is further added.

Figure 7:
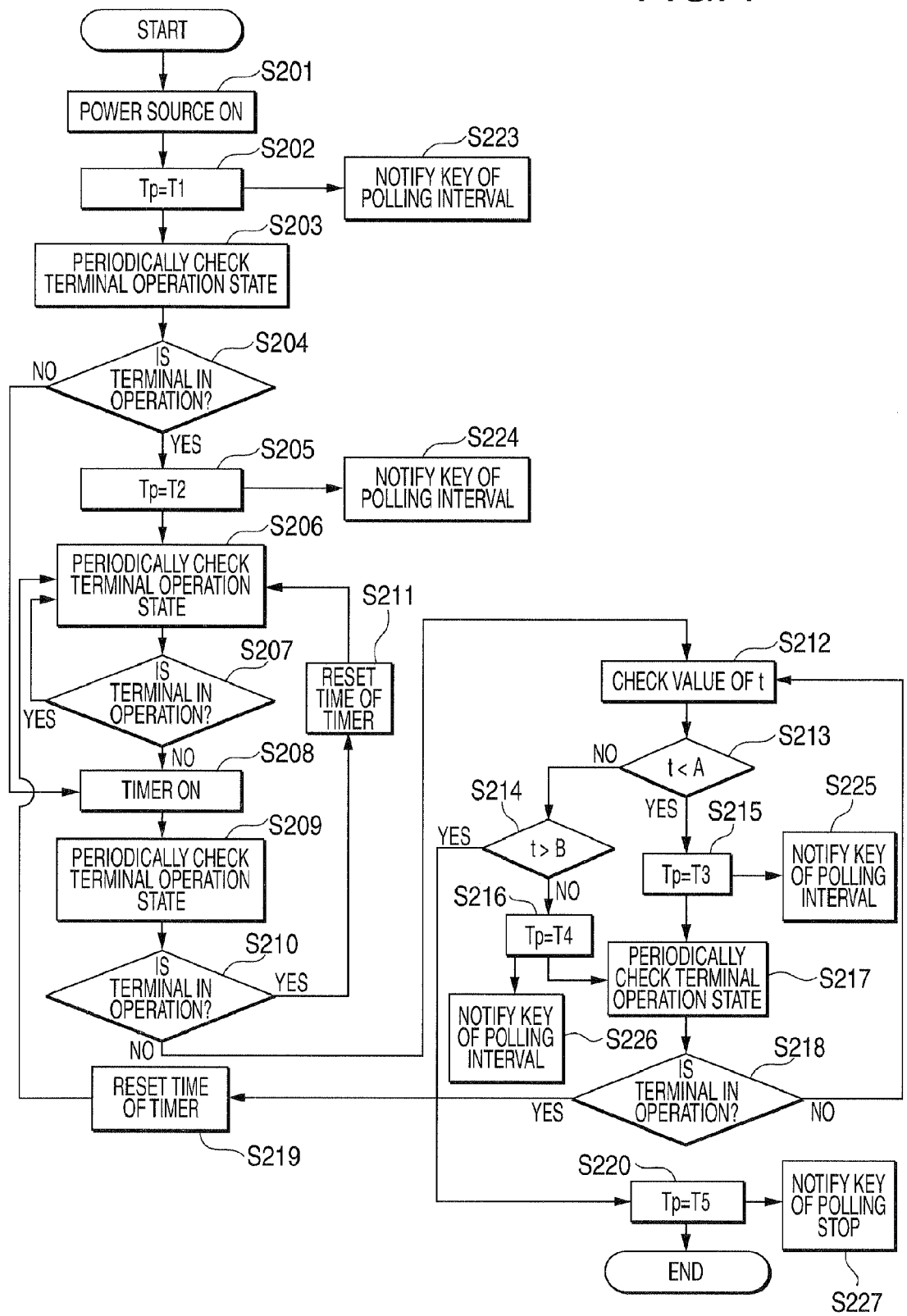
FIG. 7 is a flowchart describing an action procedure of a use limiting system of a mobile telephone according to a second embodiment of the invention.

An action of a use limiting system according to the present embodiment will hereinafter be described. FIG. 7 is a flowchart describing an action procedure of the use limiting system according to the embodiment.

In FIG. 7, processing procedures of steps S201 to S220 are the same as the processing procedures of steps S101 to S120 described based on FIG. 4 according to the first embodiment and the description is omitted.

In steps S202, S205 and S215, when the use limiting apparatus 20 starts polling with respect to the key 10 at polling intervals of T1, T2 and T3, respectively, an authentication processing part 209 makes a wireless part 230 send a time interval of polling read out of a polling interval storage part 220 in addition to an identification code read out of an identification code memory 211 (steps S223, S224 and S225).

Consequently, polling intervals of the key 10 and the use limiting apparatus 20 can be equalized and when the mobile telephone 1 is in operation, the polling interval of the key 10 is increased from T1 to T2 and when the mobile telephone 1 is not in operation, the elapsed time from the nearest operation time is clocked by a timer (3) and the polling interval of the key 10 is gradually decreased from T1 or T2 to T3-T5 according to the clocked time and the polling is performed, so that power consumption of the mobile telephone 1 and the key 10 can further be reduced without decreasing a security level.

Third Embodiment

A configuration of a key 10 and a use limiting apparatus 20 according to a third embodiment of the invention is the same as that of the first embodiment respectively shown in FIGS. 2 and 3, and in the use limiting system of the mobile telephone 1 according to the first embodiment, a function of locking an operation of a mobile telephone 1 after a predetermined time since a polling interval was changed according to an operation history of the mobile telephone 1 is further added.

Figure 8:
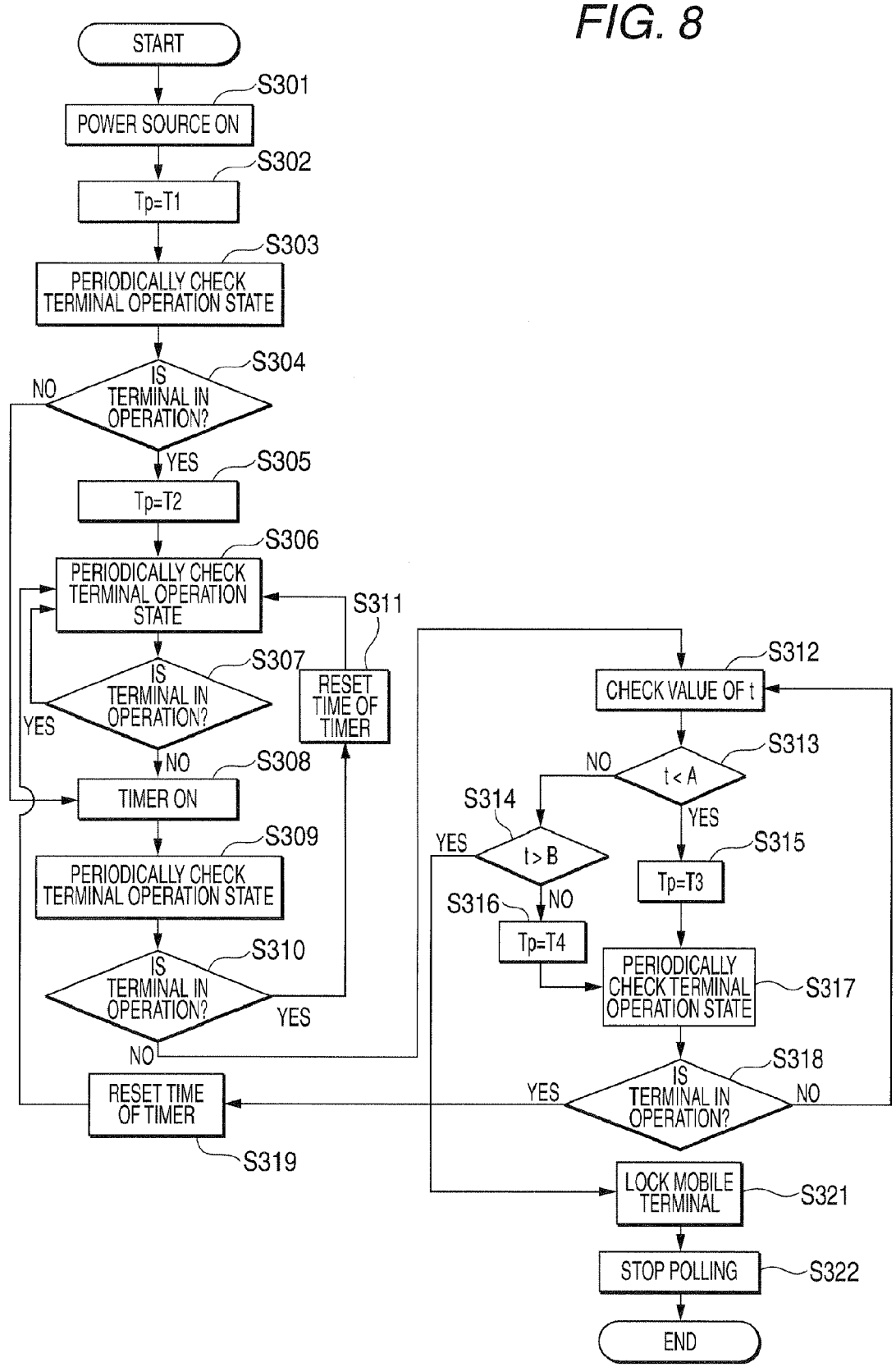
FIG. 8 is a flowchart describing an action procedure of a use limiting system of a mobile telephone according to a third embodiment of the invention.

An action of a use limiting system according to the present embodiment will hereinafter be described. FIG. 8 is a flowchart describing an action procedure of the use limiting system according to the embodiment.

In FIG. 8, processing procedures of steps S301 to S318 are the same as the processing procedures of steps S101 to S118 described based on FIG. 4 according to the first embodiment and the description is omitted.

In step S314, an authentication processing part 209 compares clocking t by a timer (3) 216 of the elapsed time from the end of the past nearest operation of the mobile telephone 1 with a second prescribed value B for condition change and in the case of determining that t>B is satisfied, a use limiting release signal generation part 219 is given instructions and an output of a use limiting release signal for enabling an operation of the mobile telephone 1 is stopped and the operation of the mobile telephone 1 is disabled (step S321) and also wireless parts 130, 230 are respectively instructed to stop polling from authentication processing parts 109, 209 of the key 10 and the use limiting apparatus 20 (step S322).

Consequently, power consumption can be reduced than the first and second embodiments. Also, when a certain time has elapsed from the end of an operation of the mobile telephone 1, the operation of the mobile telephone 1 is automatically disabled, so that in the case of theft or simultaneous loss of the mobile telephone 1 including the use limiting apparatus 20 and the key 10, a leak of personal information can be prevented and security improves.

Fourth Embodiment

A configuration of a key 10 and a use limiting apparatus 20 according to a fourth embodiment of the invention is the same as that of the first embodiment respectively shown in FIGS. 2 and 3, and in the use limiting system of the mobile telephone 1 according to the third embodiment, a function of notifying the key 10 of a polling interval from the use limiting apparatus 20 is further added.

Figure 9:
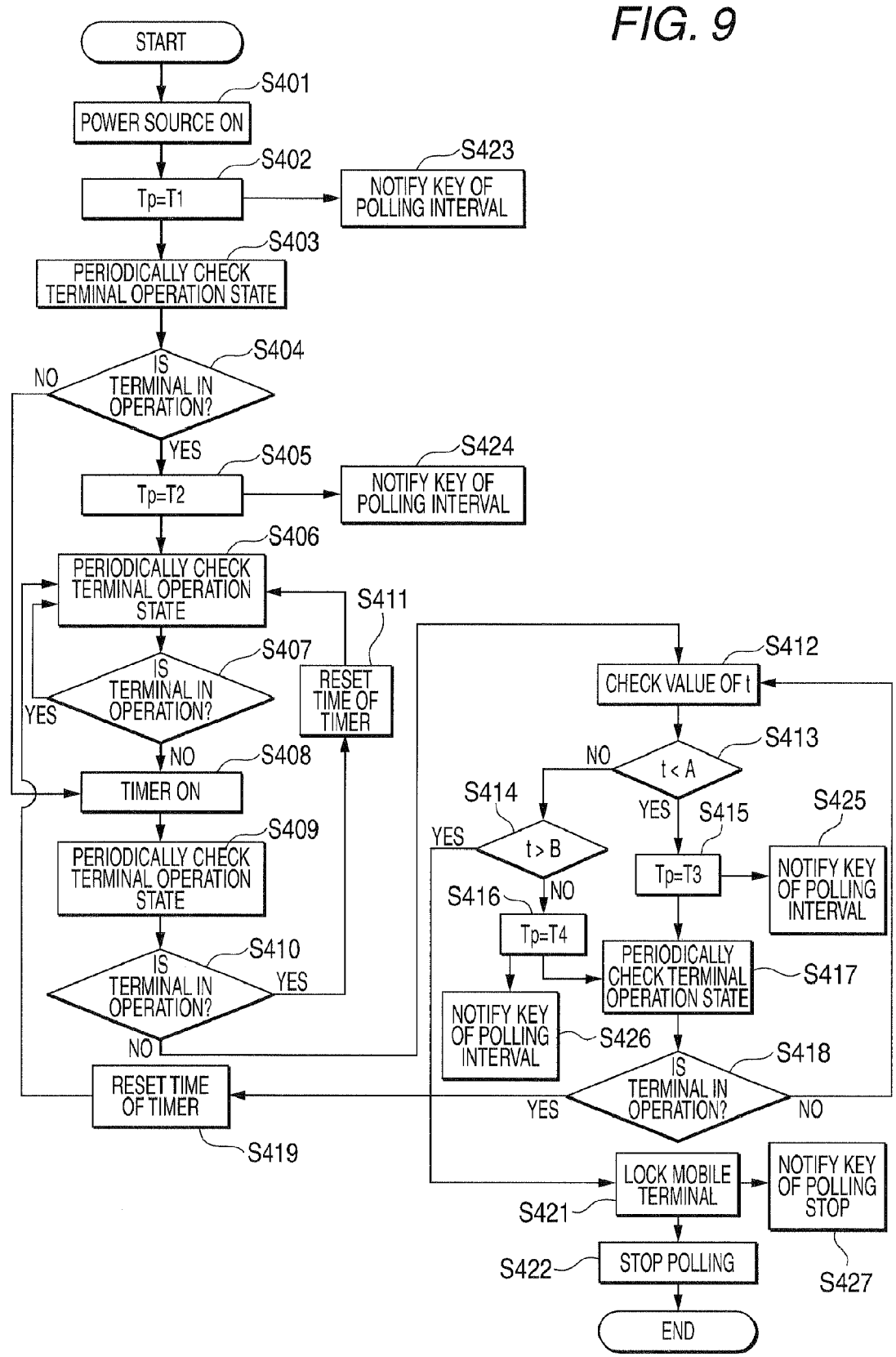
FIG. 9 is a flowchart describing an action procedure of a use limiting system of a mobile telephone according to a fourth embodiment of the invention.

An action of a use limiting system according to the present embodiment will hereinafter be described. FIG. 9 is a flowchart describing an action procedure of the use limiting system according to the embodiment.

Processing procedures of steps S401 to S422 in FIG. 9 are the same as the processing procedures of steps S301 to S322 described based on FIG. 8 according to the third embodiment and the description is omitted.

In steps S402, S405 and S415, when the use limiting apparatus 20 starts polling with respect to the key 10 at polling intervals of T1, T2 and T3, respectively, an authentication processing part 209 makes a wireless part send a polling interval read out of a polling interval storage part 220 in addition to an identification code read out of an identification code memory 211 (steps S423, S424 and S425).

Consequently, polling intervals of the key 10 and the use limiting apparatus 20 can be equalized and when the mobile telephone 1 is in operation, the polling interval of the key 10 is increased from T1 to T2 and when the mobile telephone 1 is not in operation, the elapsed time from the nearest operation time is clocked by a timer (3) and the polling interval of the key 10 is gradually decreased from T1 or T2 to T3-T5 according to the clocked time and the polling is performed, so that power consumption of the mobile telephone 1 and the key 10 can further be reduced without decreasing a security level.

Also, when a certain time has elapsed from the end of an operation of the mobile telephone 1, the operation of the mobile telephone 1 is automatically disabled, so that in the case of theft or simultaneous loss of the mobile telephone 1 including the use limiting apparatus 20 and the key 10, a leak of personal information can be prevented and security improves.

Fifth Embodiment

A configuration of a key 10 and a use limiting apparatus 20 according to a fifth embodiment of the invention is the same as that of the first embodiment respectively shown in FIGS. 2 and 3, and in the use limiting system of the mobile telephone 1 according to the first embodiment, polling by half-duplex communication is performed.

Figure 10:
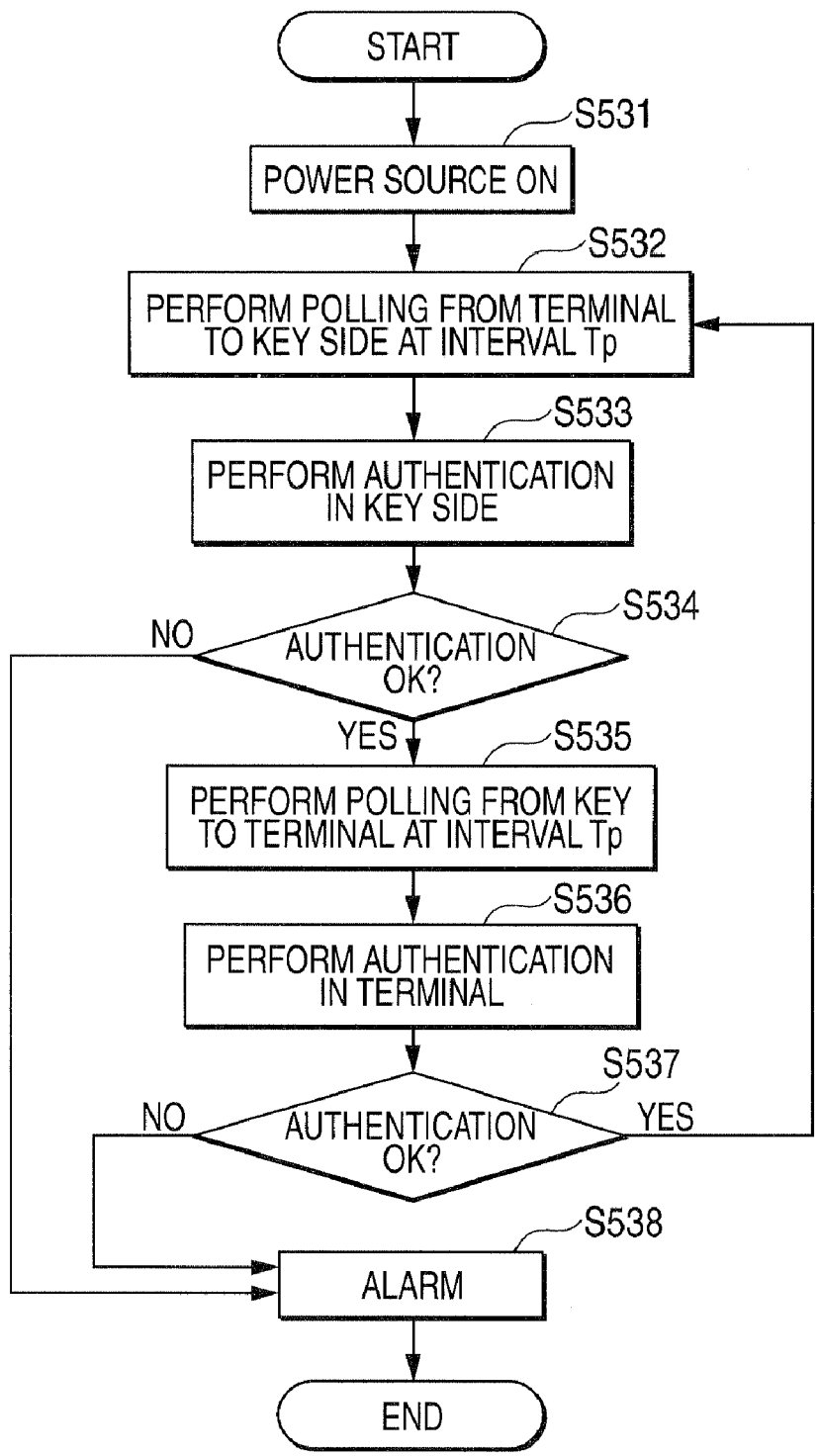
FIG. 10 is a flowchart describing an action procedure of a use limiting system of a mobile telephone according to a fifth embodiment of the invention.

An action of a use limiting system according to the present embodiment will hereinafter be described. FIG. 10 is a flowchart describing an action procedure of the use limiting system according to the embodiment.

First, when a power source of the mobile telephone 1 is turned on by a user (step S531), polling is started from the use limiting apparatus 20 to the key 10 (step S532).

The key 10 receives a polling signal sent from the use limiting apparatus 20 by a wireless part 130 and in an authentication processing part 109, an identification code of the mobile telephone 1 included in a received signal is collated with an identification code stored in an identification code memory 111 (step S533) and determines whether or not the identification codes match (step S534).

When the identification codes do not match as a result of the authentication determination, the flowchart skips to step S538 and a warning signal is outputted from an alarm circuit 112 and the user of the mobile telephone 1 is warned that there is not the mobile telephone 1 corresponding to the key 10.

On the other hand, when the identification codes match as a result of the authentication determination in step S534, the authentication processing part 109 performs polling from the key 10 to the use limiting apparatus 20 of the mobile telephone 1 (step S535).

The use limiting apparatus 20 receives a polling signal sent from the key 10 by a wireless part 230, and an authentication processing part 209 collates an identification code of the key 10 included in a received signal with an identification code stored in an identification code memory 211 (step S536) and determines whether or not the identification codes match (step S537).

When the identification codes do not match as a result of the authentication determination, the flowchart skips to step S538 and a warning signal is outputted from an alarm circuit 212 and the user of the mobile telephone 1 is warned that there is not the mobile telephone 1 corresponding to the key 10.

On the other hand, when the identification codes match as a result of the collation determination in step S537 and authentication is performed, the authentication processing part 209 returns to the procedure of step 532 and subsequent processing procedure is repeated.

Consequently, power consumption of the mobile telephone 1, particularly, power consumption in amplification parts 102, 202 of key 10 and the use limiting apparatus 20 can be reduced greatly, so that a life of a battery can be increased more.

Sixth Embodiment

A configuration of a key 10 and a use limiting apparatus 20 according to a sixth embodiment of the invention is the same as that of the first embodiment respectively shown in FIGS. 2 and 3, and in the use limiting system of the mobile telephone 1 according to the first embodiment, polling by half-duplex communication according to the fifth embodiment is performed.

Figure 11:
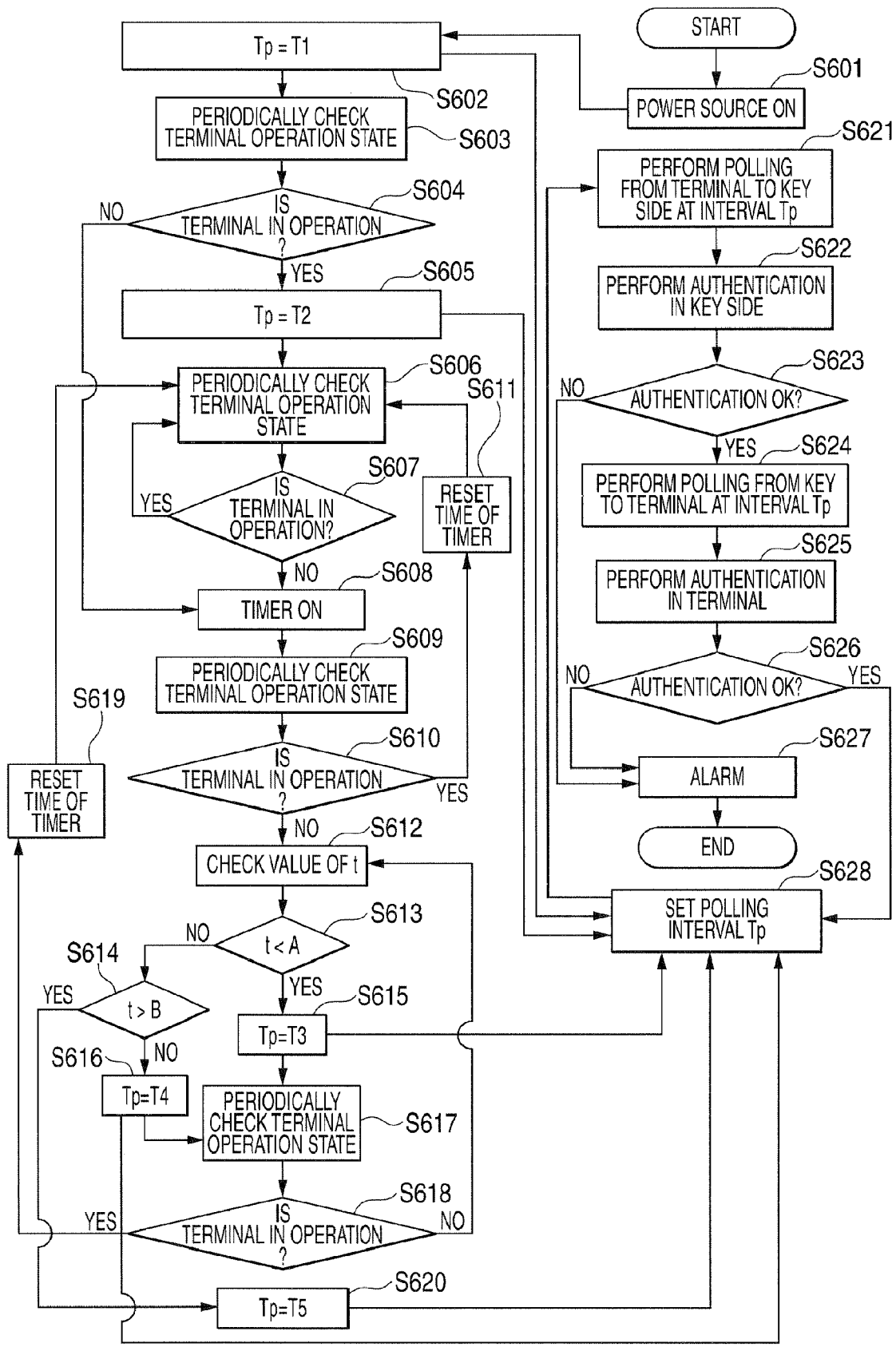
FIG. 11 is a flowchart describing an action procedure of a use limiting system of a mobile telephone according to a sixth embodiment of the invention.

An action of a use limiting system according to the present embodiment will hereinafter be described. FIG. 11 is a flowchart describing an action procedure of the use limiting system according to the embodiment.

First, when a power source of the mobile telephone 1 is turned on in step S601, the use limiting apparatus 20 rewrites a polling interval Tp to be stored in a polling interval storage part 220 by a polling interval control part 217 to an initial value T1(step S628). Thereafter, polling is performed with respect to the key 10 through a wireless part 230 (step S621).

Processing procedures of subsequent steps S603 to S614 and steps S617 to S619 are the same as the processing procedures of steps S103 to S114 and steps S117 to S119 described based on FIG. 4 according to the first embodiment and the description is omitted.

In steps S605, S615, S616 and S620, the polling interval control part 217 rewrites the polling interval Tp stored in the polling interval storage part 220 to T2, T3, T4 and T5, respectively (step S628).

On the other hand, in step S622, an authentication processing part 109 of the key 10 performs polling from the use limiting apparatus 20 at intervals T1, and collates an identification code sent out of the mobile telephone 1 with an identification code stored in an identification code memory 111 (step S622), and determines whether or not the identification codes match (step S623).

When the identification codes do not match as a result of the authentication determination, the authentication processing part 109 skips to step S627 and outputs a warning signal from an alarm circuit 112 and warns a user of the mobile telephone 1 that there is not the mobile telephone 1 corresponding to the key 10.

On the other hand, when the identification codes match as a result of the authentication determination in step S623 and authentication is performed, the authentication processing part 109 performs polling with respect to the use limiting apparatus 20 after a lapse of the polling interval T1(step S624).

The use limiting apparatus 20 receives a polling signal sent from the key 10 by a wireless part 230, and an authentication processing part 209 collates an identification code of the key 10 included in its received signal with an identification code stored in an identification code memory 211 (step S625) and determines whether or not the identification codes match (step S626).

When the identification codes do not match as a result of the authentication determination, the authentication processing part 209 skips to step S627 and outputs a warning signal from an alarm circuit 212 and warns the user of the mobile telephone 1 that there is not the mobile telephone 1 corresponding to the key 10.

On the other hand, when the identification codes match as a result of the authentication determination in step S626 and authentication is performed, the authentication processing part 209 skips to step S628 and rewrites the polling interval Tp stored in the polling interval storage part 220 (step S628), and returns to the procedure of step S621 and repeats the procedures of S622 to S628 below.

Consequently, power consumption of the mobile telephone 1, particularly, power consumption in amplification parts 102, 202 of the key 10 and the use limiting apparatus 20 can be reduced greatly, so that a life of a battery can be increased more.

Seventh Embodiment

Figure 12:
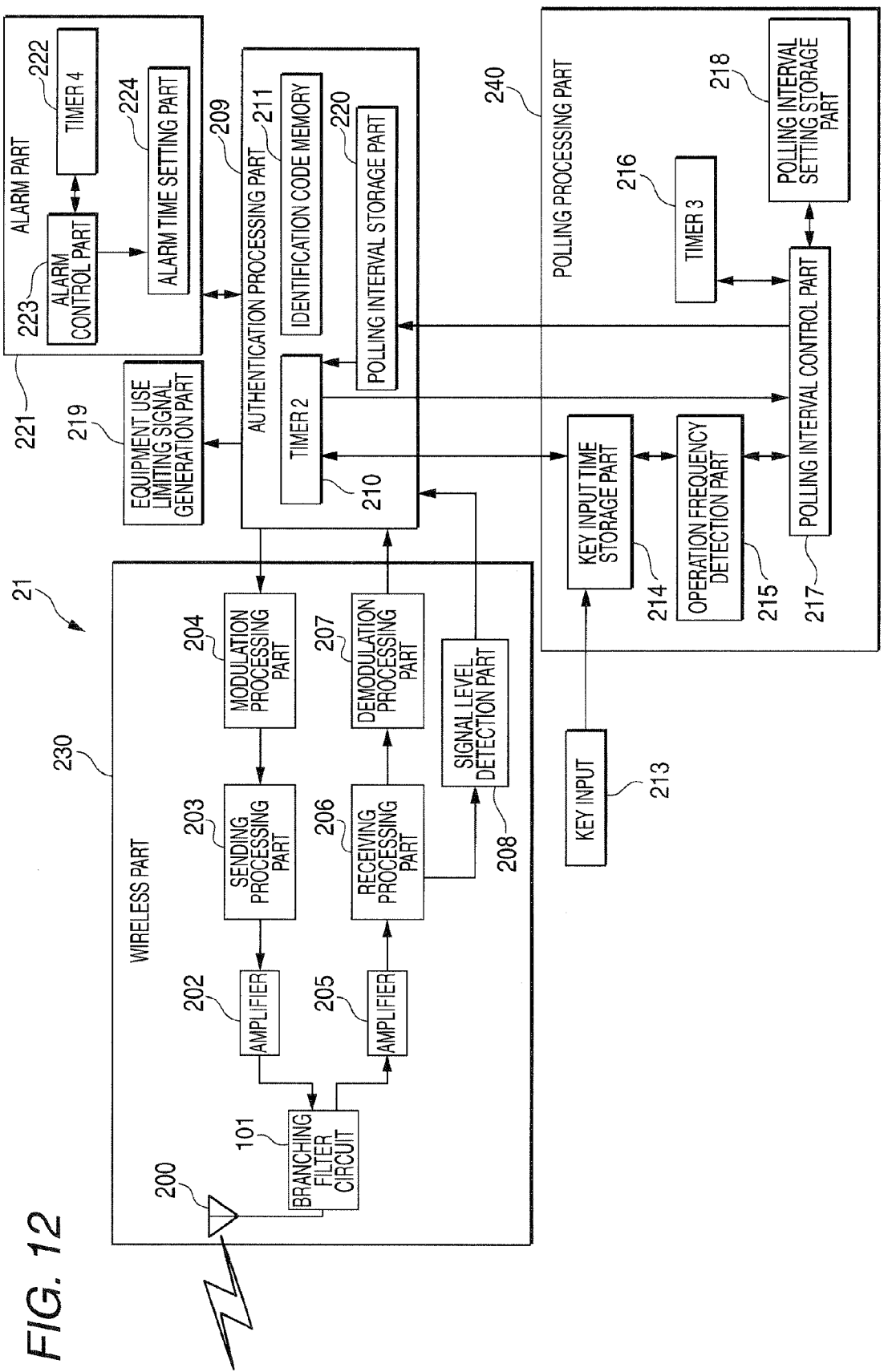
FIG. 12 is a diagram showing an outline configuration of a use limiting apparatus 21 according to a seventh embodiment of the invention.

FIG. 12 is a diagram showing an outline configuration of a use limiting apparatus 21 according to a seventh embodiment of the invention. As shown in the same diagram, the use limiting apparatus 21 is configured to have an alarm part 221 instead of the alarm circuit 212 in the use limiting apparatus 20 described based on FIG. 3 according to the first embodiment. The same numerals are assigned to the same configuration as that of FIG. 3 and the description is omitted.

The alarm part 221 is configured to comprise a timer (4) 222 for measuring the elapsed time since alarm notification was started, an alarm control part 223 for controlling the alarm notification, and an alarm time setting part 224 for setting alarm time.

Figure 13:
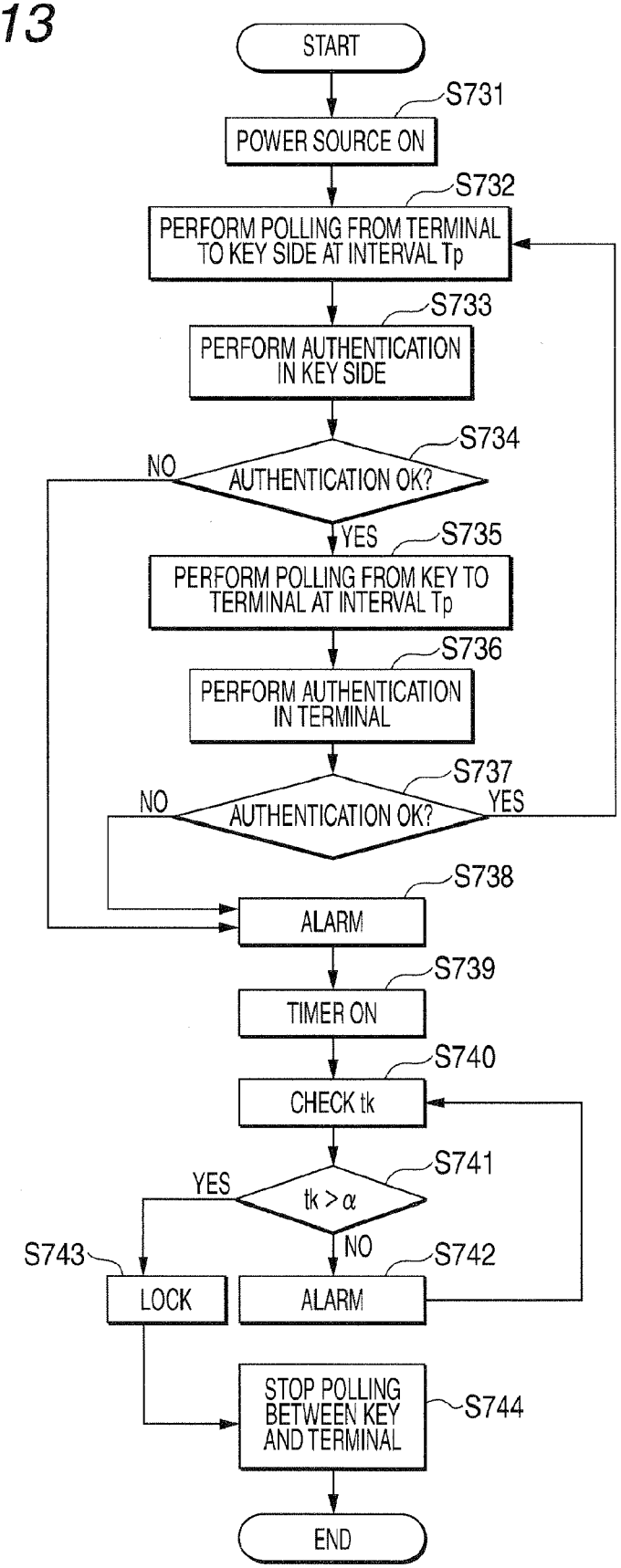
FIG. 13 is a flowchart describing an action procedure of a use limiting system of a mobile telephone according to the seventh embodiment of the invention.

Next, an action of a use limiting system according to the present embodiment configured as mentioned above will be described. FIG. 13 is a flowchart describing an action procedure of the use limiting system according to the embodiment.

In FIG. 13, processing procedures of steps S731 to S738 are the same as the processing procedures of steps S531 to S538 described based on FIG. 10 according to the fifth embodiment and the description is omitted.

In step S739, the timer (4) 222 is activated by the alarm control part 223 and elapsed time tk since an alarm was started is clocked. Then, the elapsed time tk is compared with an arbitrary prescribed time α (step S740) and it is determined whether or not the elapsed time tk exceeds the prescribed time α (step S741). When the elapsed time tk does not exceed the prescribed time α as a result of that, similar processing is repeated by returning to the procedure of step S740 while continuing the alarm.

On the other hand, when the alarm time tk exceeds the prescribed time α as a result of the collation determination in step S741, an output of a use limiting release signal in a use limiting release signal generation part 219 is stopped and a mobile telephone 1 is changed to an inoperable state unless particular measures are taken (step S743) and also polling between a key 10 and the use limiting apparatus 20 is stopped (step S744).

In accordance with the use limiting apparatus according to the embodiment as described above, when the mobile telephone 1 is forcibly stolen though an alarm is given, the mobile telephone 1 can be changed to an inoperable state and a leak of personal information can be prevented to improve security.

Eighth Embodiment

A configuration of a key according to an eighth embodiment of the invention is the same as that of the first embodiment shown in FIG. 2, and a configuration of a use limiting apparatus is the same as that of the seventh embodiment shown in FIG. 12.

Figure 14:
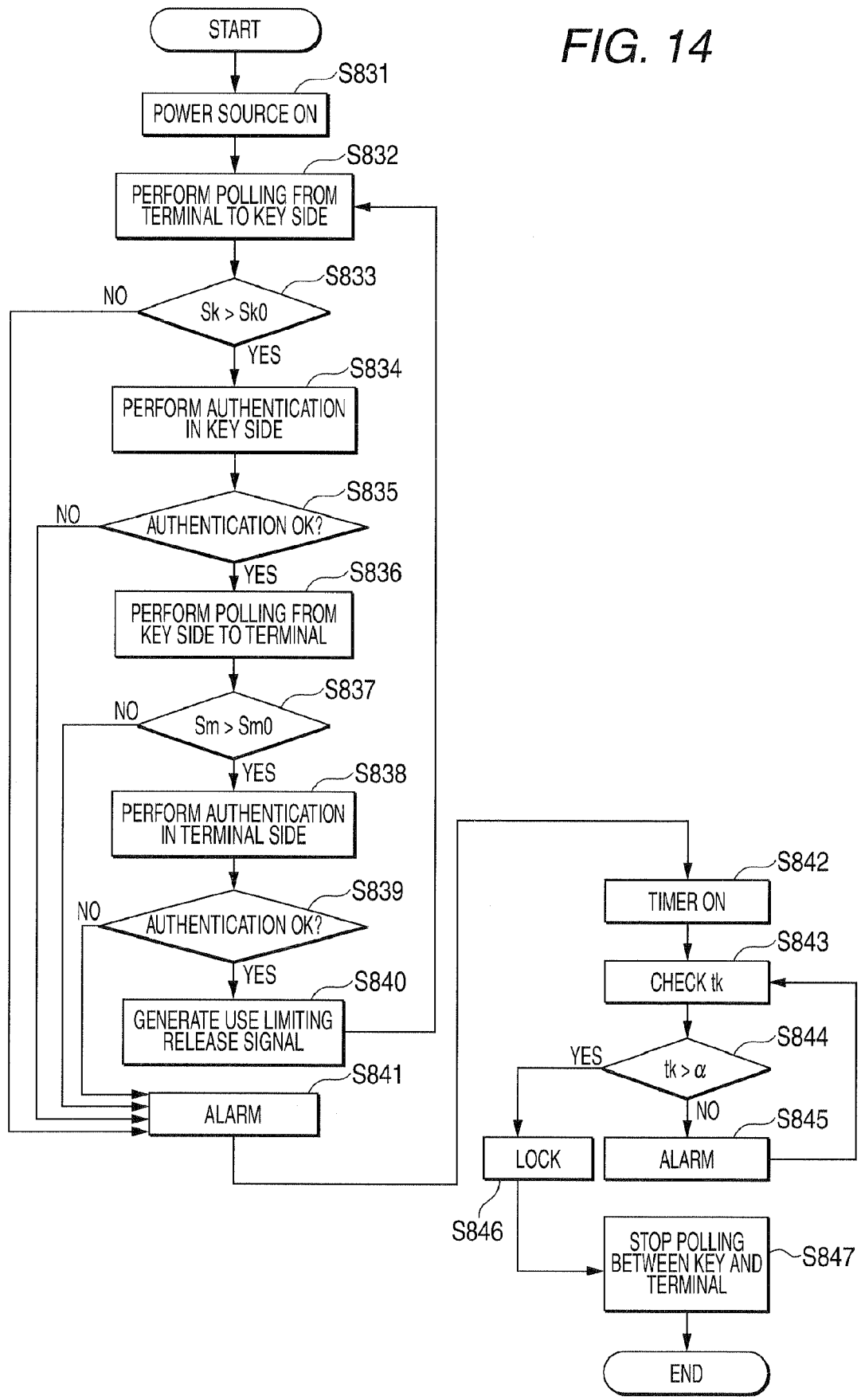
FIG. 14 is a flowchart describing an action procedure of a use limiting system of a mobile telephone according to an eighth embodiment of the invention.

An action of a use limiting system according to the present embodiment will hereinafter be described. FIG. 14 is a flowchart describing an action procedure of the use limiting system according to the embodiment.

Processing procedures of steps S831 to S841 in FIG. 14 are the same as the processing procedures of steps S131 to S141 described based on FIG. 5 according to the first embodiment and also processing procedures of steps S842 to S847 are the same as the processing procedures of steps S739 to S744 described based on FIG. 13 according to the seventh embodiment and the descriptions are respectively omitted.

In accordance with the use limiting system according to the embodiment, only when a received signal level of polling satisfies a prescribed value and an identification code is authenticated, a use limiting release signal is generated and the mobile telephone 1 is changed to an operable state and also, when the mobile telephone 1 is forcibly stolen though an alarm is given, the mobile telephone 1 can be changed to an inoperable state and a leak of personal information can be prevented to improve security.

Ninth Embodiment

Figure 18:
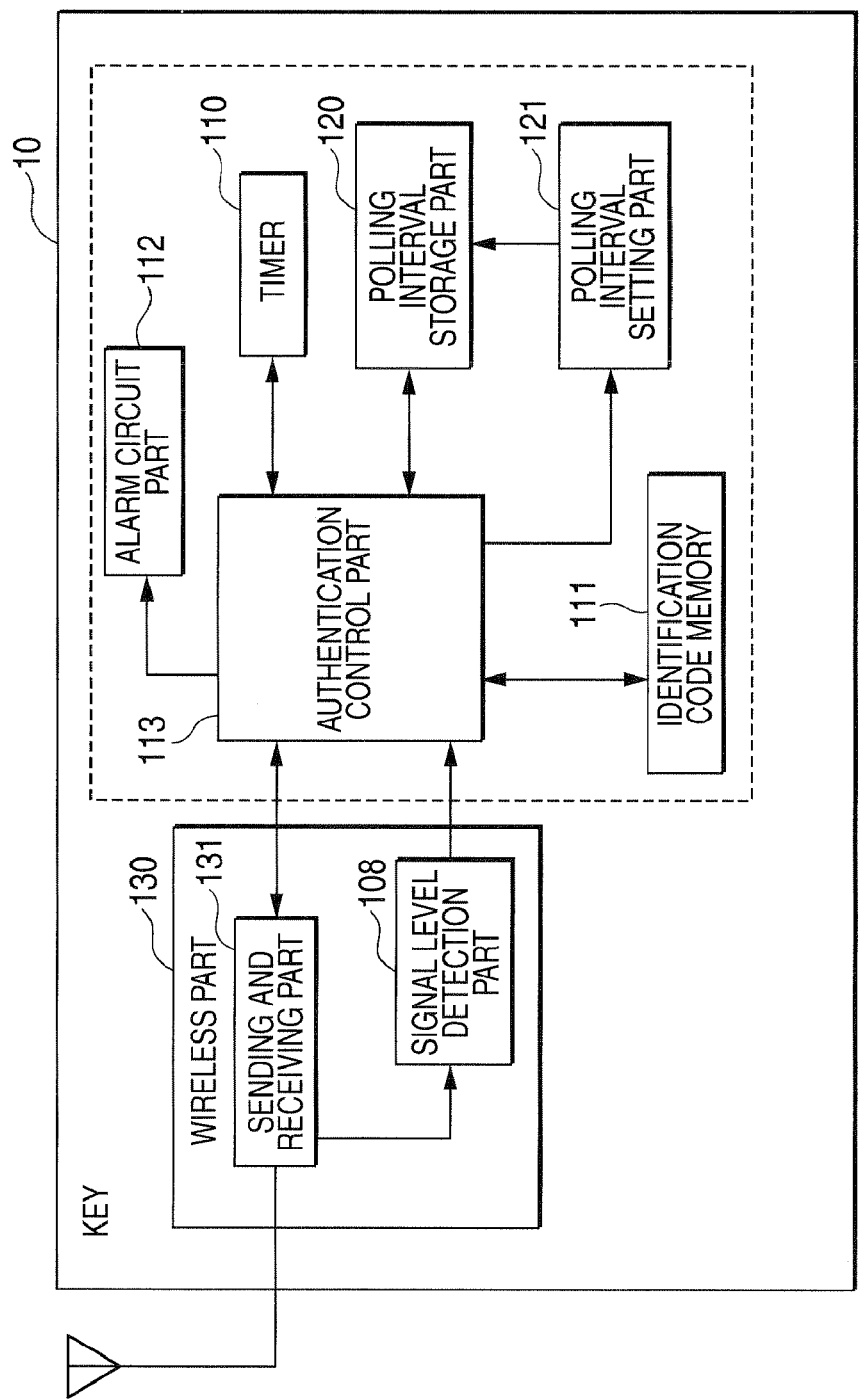
FIG. 18 is a diagram showing an outline configuration of a key according to a ninth embodiment of the invention.

FIG. 18 is a diagram showing an outline configuration of a key according to a ninth embodiment of the invention. As shown in the same diagram, a key 10 is configured to have a wireless part 130, an authentication control part 113, an alarm circuit part 112, a polling interval setting part 121 for setting a polling interval, a polling interval storage part 120 for storing the set polling interval, a timer 110 for clocking a polling interval, and an identification code memory 111 for storing a preset identification code unique to the key 10. In addition, the identification code memory 111 of the key 10 may store an identification code unique to a mobile telephone 1 or a use limiting apparatus 20 operating as a pair in addition to the identification code unique to the key 10. In addition, FIG. 18 is a diagram concretely and clearly showing the components of FIG. 2, and has an action and a configuration almost similar to those of FIG. 2. Also, the authentication control part 113 in the present embodiment corresponds to the authentication processing part in each of the embodiments.

The wireless part 130 in the key 10 comprises an antenna 100 for sending and receiving radio waves, a sending and receiving part 131, and a signal level detection part 108. In addition, the sending and receiving part 131 in the key 10 corresponds to the sending and receiving processing parts in the key of each of the embodiments, and is the same as the sending and receiving processing parts in the key of each of the embodiments in parts which are not otherwise specified.

The antenna 100 in the sending and receiving part 131 receives radio waves sent from the use limiting apparatus 20 of the side of the mobile telephone 1 and also converts an authentication signal from the authentication control part 113 into radio waves.

The sending and receiving part 131 branches, amplifies, filters and demodulates a signal received by the antenna 100 and sends the signal to the authentication control part 113, and also modulates, filters and amplifies a signal sent from the authentication control part 113 and sends the signal to the antenna 100.

The signal level detection part 108 sends a result in which a level of a signal received by the antenna 100 and sent to the sending and receiving part 131 is compared with a prescribed value to the authentication control part 113.

In the authentication control part 113, the following processing is performed with respect to a signal sent from the use limiting apparatus 20.

When a result compared with a prescribed value sent from the signal level detection part 108 is less than the prescribed value, it is decided that the key 10 is separate from the use limiting apparatus 20 at longer than a predetermined distance, and a warning signal is outputted in the alarm circuit part 112 and when the result is the prescribed value or more, it proceeds to a determination as to whether or not a signal sent from the sending and receiving part 131 matches with an identification code stored in the identification code memory 111. When the signal does not match with the identification code, a warning signal is outputted in the alarm circuit part 112 and when the signal matches with the identification code, an authentication action is continued. Also, when information to the effect that setting of a polling interval is changed (or a polling interval is set) is included in a received signal, a polling interval stored in the polling interval storage part 120 is rewritten to a set value specified from the use limiting apparatus 20 in the polling interval setting part 121.

Further, in the authentication control part 113, at the time of an authentication action, an identification code is read out of the identification code memory and clocking is performed by the timer and an authentication signal is sent to the sending and receiving part 131 in the wireless part 130 at intervals written in the polling interval storage part 120.

Also, the description in which the authentication control part 113 makes a determination of an identification code after making a determination of a signal level has been made herein, but a determination of a signal level may be made after making a determination of an identification code, or both the determinations may be processed in parallel. Also, the authentication control part 113 may decide that the key 10 is separate from the use limiting apparatus 20 at longer than a predetermined distance when an identification code cannot be received without making a determination of a signal level.

Also, when the identification code memory 111 of the key 10 stores an identification code unique to the mobile telephone 1 or the use limiting apparatus 20 operating as a pair in addition to an identification code unique to the key 10, it can also be constructed so that the authentication control part 113 of the key 10 decides whether or not a received identification code is the identification code unique to the mobile telephone 1 or the use limiting apparatus 20 operating as a pair, and the key 10 reads out an identification code unique to the key 10 and performs clocking by the timer and sends an authentication signal to the sending and receiving part 131 in the wireless part 130 at intervals written in the polling interval storage part 120.

Figure 19:
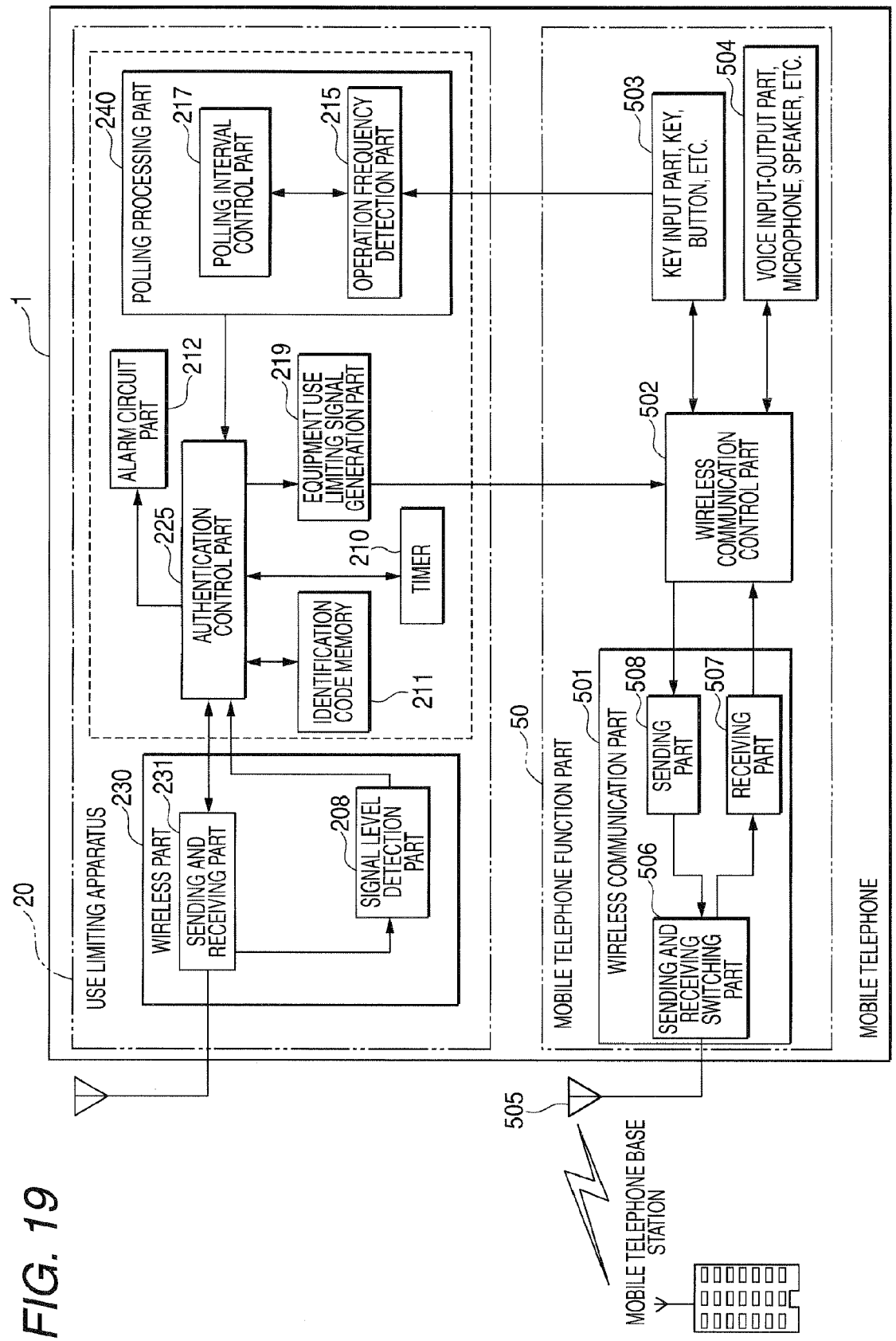
FIG. 19 is a diagram showing an outline configuration of a mobile telephone according to the ninth embodiment of the invention.

FIG. 19 is a diagram showing an outline configuration of a mobile telephone according to the ninth embodiment of the invention. As shown in the same diagram, a mobile telephone 1 has a mobile telephone function part 50 and a use limiting apparatus 20. In addition, FIG. 19 is a diagram concretely and clearly showing the components of FIG. 3, and has an action and a configuration almost similar to those of FIG. 3. Also, an authentication control part 225 in the present embodiment corresponds to the authentication processing part in each of the embodiments.

The mobile telephone function part 50 is a function part of a normal mobile telephone, and concretely has a wireless communication part 501 for communicating with a mobile telephone base station, a wireless communication control part 502 for controlling the wireless communication part 501, a key input part 503 and a voice input-output part 504.

The key input part 503 detects an action of an operation key of the mobile telephone 1 and sends its signal to the wireless communication control part 502.

The voice input-output part 504 converts a voice inputted to a microphone into an electrical signal and sends the voice to the wireless communication control part 502, or converts an electrical signal sent from the wireless communication control part 502 into a voice.

An antenna 505 receives a signal from a communication apparatus (a mobile telephone, a fixed-line telephone, a PHS, a public telephone, etc.) of a party through a base station and generates a received signal and gives the signal to a receiving part 507 through a sending and receiving switching part 506. The receiving part 507 receives a received signal from the antenna and gives the signal to the wireless communication control part 502. Also, a sending part 501 gives a sent signal to the antenna. The antenna 505 receives the sent signal from the sending part 508 and generates and sends a wireless sent signal.

The wireless communication control part 502 controls the sending and receiving switching part 506, the sending part 508, the receiving part 507, the key input part 503, the voice input-output part 504, etc. based on an operation signal from the key input part 503.

The use limiting apparatus 20 comprises a wireless part 230, a polling processing part 240, an authentication control part 225, an equipment use limiting signal generation part 219, an alarm circuit part 212, a timer 210 for clocking a polling interval, and an identification code memory 211.

Each part constructing the wireless part 230 has the same functions as those of the same names among the function parts constructing the wireless part 130 in the key 10. Because of this, description is omitted herein.

The identification code memory 211 stores a preset identification code unique to the use limiting apparatus 20. In addition, an identification code unique to the key 10 operating as a pair may be stored in addition to the identification code unique to the use limiting apparatus 20.

In the authentication control part 225, the following processing is performed with respect to a signal sent from the key 10.

When a result compared with a prescribed value sent from a signal level detection part 208 is less than the prescribed value, it is decided that the use limiting apparatus 20 is separate from the key 10 at longer than a predetermined distance, and a warning signal is outputted in the alarm circuit part 212 and when the result is the prescribed value or more, it proceeds to a determination as to whether or not a signal sent from a sending and receiving part 231 matches with an identification code stored in the identification code memory. When the signal does not match with the identification code, a warning signal is outputted in the alarm circuit part 212 and also a use limiting signal is generated in the equipment use limiting signal generation part 219. When the signal matches with the identification code, an authentication action is continued.

Further, in the authentication control part 225, at the time of an authentication action, an identification code is read out of the identification code memory 211 and clocking is performed by the timer 210 and an authentication signal is sent to the sending and receiving part 231 in the wireless part 230 at intervals notified from a polling interval control part 217.

Also, the description in which the authentication control part 225 makes a determination of an identification code after making a determination of a signal level has been made herein, but a determination of a signal level may be made after making a determination of an identification code, or both the determinations may be processed in parallel. Also, the authentication control part 225 may decide that the key 10 is separate from the use limiting apparatus 20 at longer than a predetermined distance when an identification code cannot be received without making a determination of a signal level.

Further, the authentication control part 225 notifies the key 10 of a polling interval (authentication interval) set by the polling interval control part 217 of the polling interval processing part 240 through the sending and receiving part 231.

The equipment use limiting signal generation part 219 determines whether or not a signal sent from the sending and receiving part 231 matches with an identification code stored in the identification code memory 211 in the authentication control part 225, with the result that when the signal does not match with the identification code, based on a control signal sent from the authentication control part 225, a use limiting signal is generated in the equipment use limiting signal generation part 219 and is sent to the wireless communication control part 502 of the mobile telephone function part 50.

Also, when the signal matches with the identification code as a result of determining whether or not the signal sent from the sending and receiving part 231 matches with the identification code stored in the identification code memory 211 in the authentication control part 225, based on a control signal sent from the authentication control part 225, an output of a use limiting signal is stopped in the equipment use limiting signal generation part 219.

The alarm circuit part 212 gives an alarm based on a control signal sent from the authentication control part 225 in the case of deciding that the use limiting apparatus 20 is separate from the key 10 at longer than a predetermined distance in the authentication control part 225. In addition, the alarm may be omitted.

In addition, when the identification code memory 211 of the use limiting apparatus 20 stores an identification code unique to the key 10 operating as a pair in addition to an identification code unique to the use limiting apparatus 20, it can also be constructed so that the authentication control part 225 of the use limiting apparatus 20 decides whether or not a received identification code is the identification code unique to the key 10 operating as a pair, and the authentication control part 225 reads out an identification code unique to the use limiting apparatus 20 and performs clocking by the timer and sends an authentication signal to the sending and receiving part 231 in the wireless part 230 at intervals notified from a polling interval control part 217.

Also, the authentication control part 225 of the use limiting apparatus 20 can be constructed so as not to immediately decide that the key 10 is separate from the use limiting apparatus 20 at longer than a predetermined distance when the identification code unique to the key 10 operating as a pair cannot be received. That is, after the identification code unique to the key 10 operating as a pair is received, the authentication control part 225 can also send random numbers (challenge signal) to the key 10 and receive an answer signal (response signal) to this and output a signal for releasing use limiting from the equipment use limiting signal generation part 219 when it can be checked that the answer signal (response signal) is an answer signal from the key 10 paired, or output a signal for limiting use when it cannot be checked that the answer signal (response signal) is the answer signal. Here, the answer signal (response signal) is set at a signal in which the random numbers (challenge signal) are encrypted by a common key and thereby, the use limiting apparatus 20 can more surely check that a received answer signal is an answer signal from the paired key 10 by decoding the received answer signal (response signal) by the same common key and checking that a decoded result is the same as the random numbers (challenge signal) sent. Here, it is assumed that the key 10 and the use limiting apparatus 20 store the same common key.

Also, when the challenge signal and the response signal are used, in notification of a polling interval (authentication interval) from the use limiting apparatus 20 to the key 10 as described above, temporary notification is provided from the use limiting apparatus 20 to the key 10 in addition to the challenge signal and acknowledgment (ACK) is performed from the key 10 to the use limiting apparatus 20 in addition to the response signal and finally, notification can also be provided from the use limiting apparatus 20 to the key 10 in addition to an identification code unique to the use limiting apparatus 20. Or, notification is provided from the use limiting apparatus 20 to the key 10 in addition to at least the challenge signal and acknowledgment (ACK) can also be performed from the key 10 to the use limiting apparatus 20 in addition to the response signal. Then, the use limiting apparatus 20 can also change setting to the contents of notification after the acknowledgment (ACK) is received from the key 10 to the use limiting apparatus 20 in addition to the response signal. Similarly, the key 10 can also change setting to the contents of notification after the final notification from the use limiting apparatus 20. By following such a procedure, notification can be provided more surely. It is important to surely provide such notification in the case of surely performing authentication.

The polling processing part 240 is configured to comprise the polling interval control part 217 and an operation frequency detection part 215.

The operation frequency detection part 215 detects key operation frequency of the mobile telephone 1 detected by the key input part 503 and sends its frequency to the polling interval control part 217.

The polling interval control part 217 decides a polling interval based on a result received from the operation frequency detection part 215 and sends its result to the authentication control part 225.

FIG. 19 shows the block diagram in which the timer 210 is disposed inside the use limiting apparatus 20, but the timer can be configured to count (when necessary, divide a frequency) a clock signal had by the mobile telephone function part 50. That is, it can be configured to count (when necessary, divide a frequency) a pulse etc. of a clock signal from a point in time of detecting an operation etc.

Next, an action of the use limiting apparatus configured as mentioned above will be described using FIGS. 20, 21 and 22.

Figure 20:
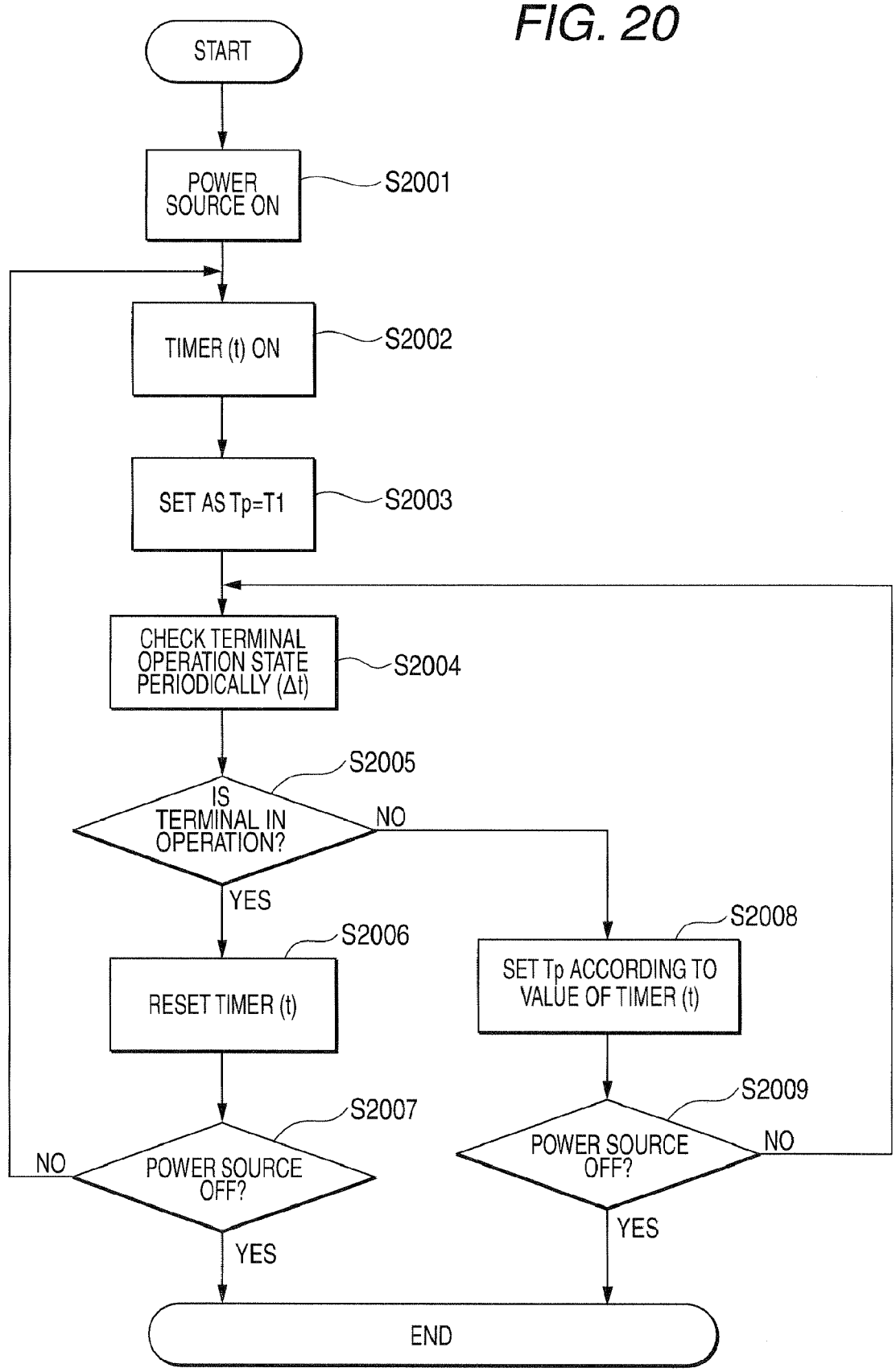
FIG. 20 is a diagram describing an action of polling interval setting by a use limiting apparatus of the ninth embodiment of the invention.

FIG. 20 is a diagram describing an action of polling interval setting by the use limiting apparatus of the ninth embodiment of the invention. First, when a power source of a mobile telephone 1 is turned on (step S2001), the use limiting apparatus 20 turns on the timer 210 (step S2002), and sets a polling interval Tp to a value of T1(step S2003), and starts polling through the wireless part 230, and also notifies the key by, for example, including information about the polling interval in a part of an authentication signal sent to the side of the key 10.

Subsequently, the polling interval control part 217 of the use limiting apparatus 20 makes the operation frequency detection part 215 refer to the key input part 503 at intervals of a period Δt and determines whether or not the mobile telephone 1 is in operation (step S2004). When the mobile telephone 1 is in operation (step S2005) as a result of that, a value of the timer 210 is reset (step S2006).

Thereafter, when a power source OFF button is not pushed (step S2007), it returns to the action for turning on the timer 210 and setting the polling interval Tp to the value of T1and starting polling through the wireless part 230. When the power source OFF button is pushed (step S2007), the present flow ends.

On the other hand, when the mobile telephone 1 is not in operation (step S2005), clocking of the timer 210 is continued. According to a value (t) of the timer 210, for example, settings to Tp=T1for t<A, Tp=T2for A≦t≦B, Tp=T3for B≦t<C, Tp=T4for C≦t are made (step S2008) and also, the key is notified by, for example, including information about the polling interval in a part of an authentication signal sent to the side of the key 10.

Thereafter, when the power source OFF button is not pushed (step S2009), the polling interval control part 217 of the use limiting apparatus 20 again returns to the action for making the operation frequency detection part 215 refer to the key input part 503 at intervals of a period Δt and determining whether or not the mobile telephone 1 is in operation. When the power source OFF button is pushed, the present flow ends.

Figure 21:
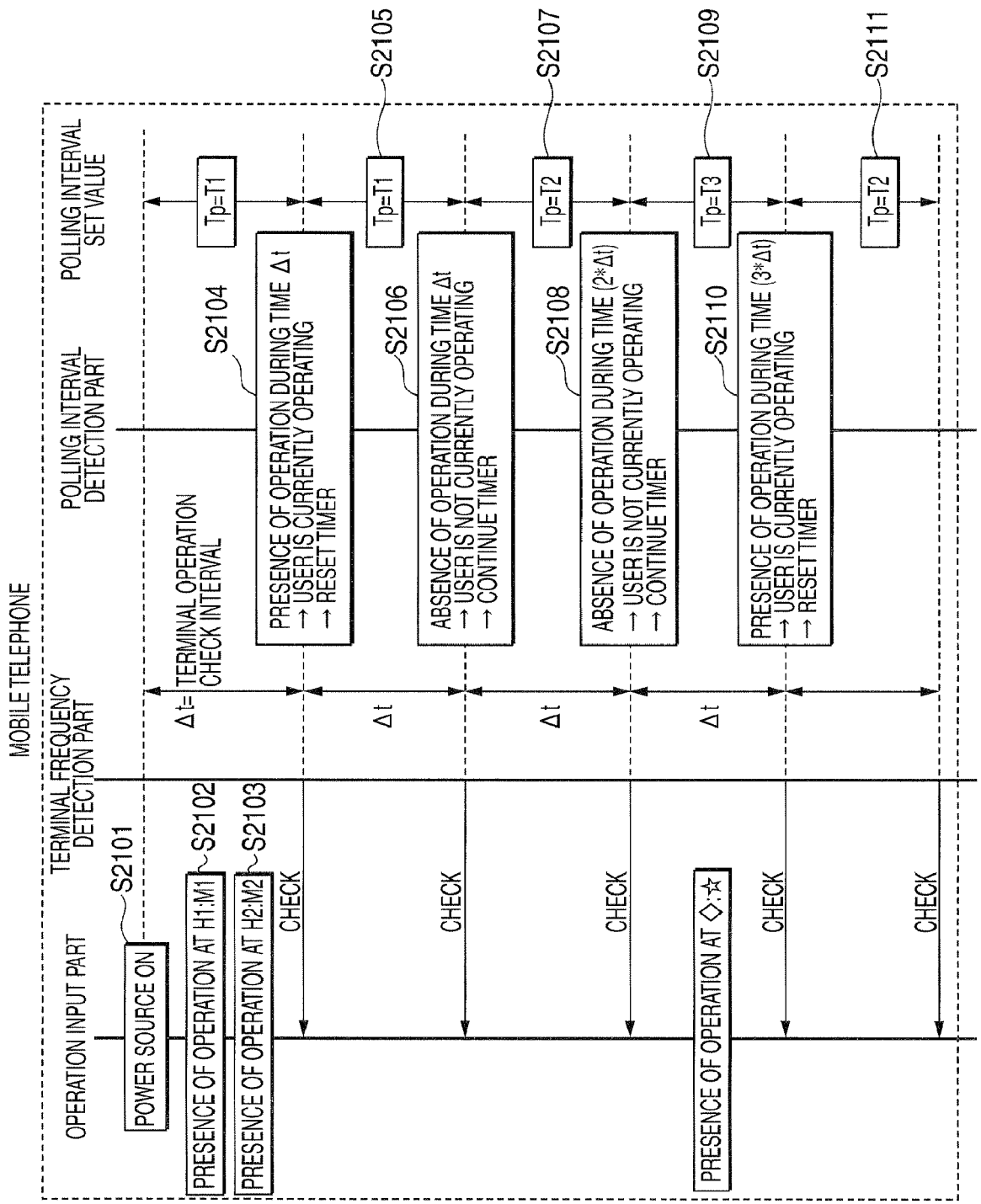
FIG. 21 is a diagram describing one example of a detection method of an operation frequency detection part in FIG. 20.

FIG. 21 is a diagram describing one example of a detection method of the operation frequency detection part in FIG. 20.

After a power source of the mobile telephone 1 is turned on by the key input part 503 (step S2101), a polling interval Tp is set to T1(default time interval) and authentication is performed. Thereafter, it is assumed that operations were performed at H1:M1 and H2:M1 (step S2102, step S2103). The operation frequency detection part 215 detects that the operations were performed during the time of Δt, and notifies the polling interval control part 217. Since the operations were performed during the time of Δt, the polling interval control part 217 decides that a user is currently operating the mobile telephone 1, and resets a timer value (step S2104) and also sets the polling interval Tp to T1(step S2105).

The operation frequency detection part 215 detects that an input from the key input part 503 is not done during the next time of Δt, and notifies the polling interval control part 217. Since the operation was not performed during the time of Δt, the polling interval control part 217 decides that a user is not currently operating the mobile telephone 1, and continues a timer value (step S2106) and also sets the polling interval Tp to T2(step S2107).

Then, the operation frequency detection part 215 detects that an input from the key input part is not done during the next time of Δt, and notifies the polling interval control part 217. Since the operation was not performed during the time of 2 multiplied by Δt, the polling interval control part 217 decides that a user is not currently operating the mobile telephone 1, and continues clocking by the timer 210 (step S2108) and also sets the polling interval Tp to T3(step S2109).

Then, the operation frequency detection part 215 detects that an operation was performed during the time of Δt, and notifies the polling interval control part 217. Since the operation was performed during the time of 3 multiplied by Δt, the polling interval control part 217 decides that a user is currently operating the mobile telephone 1, and resets a timer value of the timer 210 (step S2110) and also sets the polling interval Tp to T2(step S2111).

Figure 22:
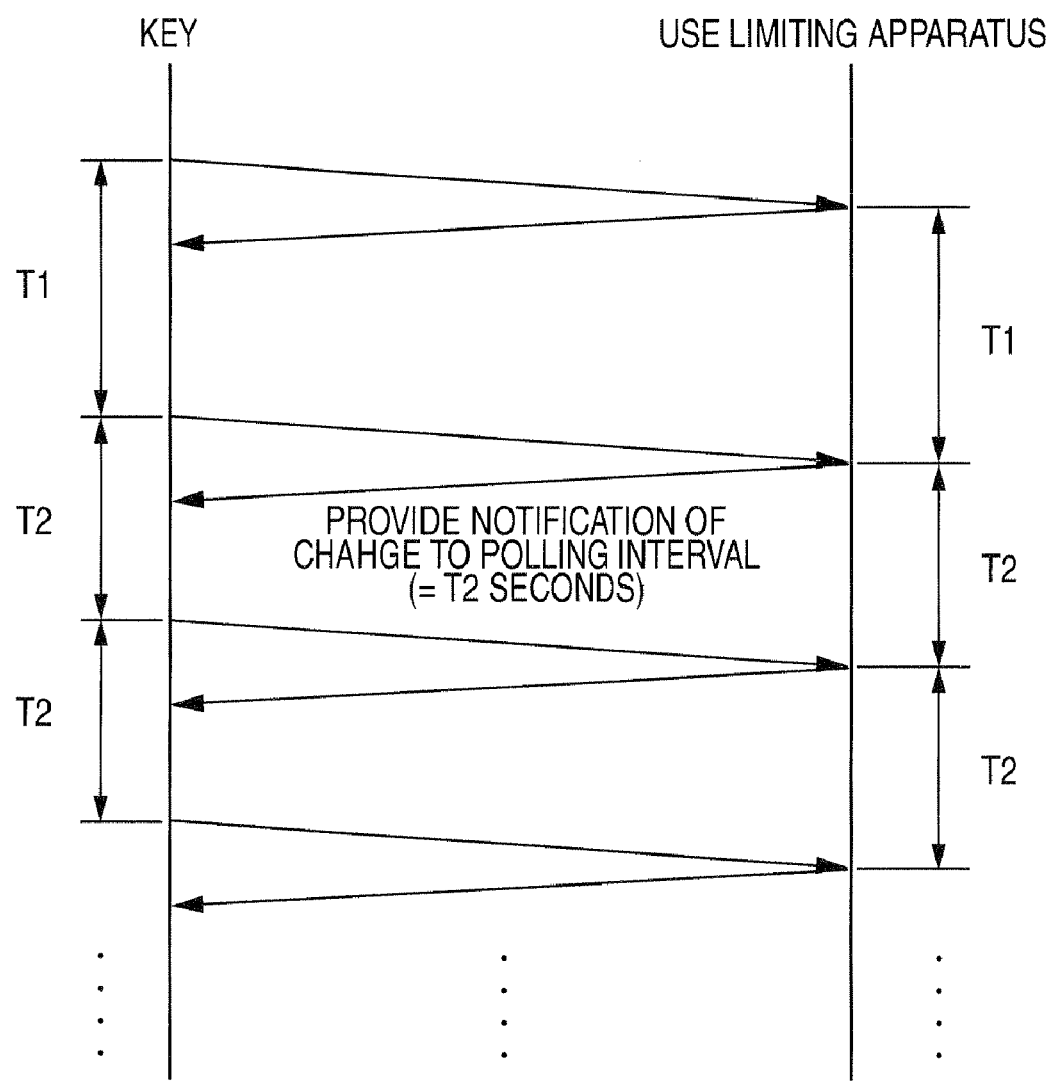
FIG. 22 is a diagram describing one example of a flow of polling interval transition in FIG. 20.
Figure 23:
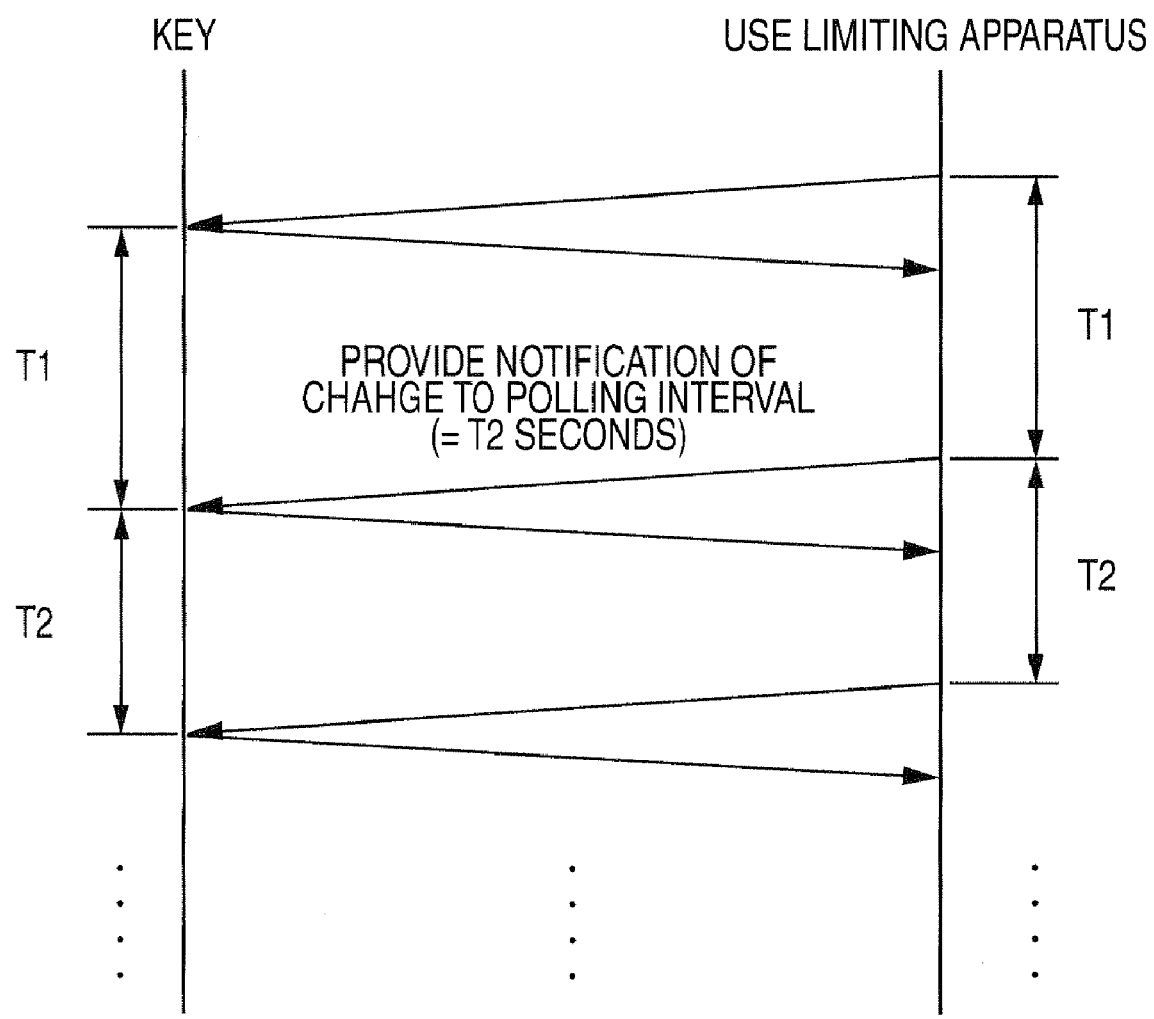
FIG. 23 is a diagram describing one example of a flow of polling interval transition in FIG. 20.

FIGS. 22 and 23 are diagrams describing one example of a flow of polling interval transition in FIG. 20.

FIG. 22 is the case where an authentication signal is sent from the side of the key 10 and the use limiting apparatus 20 responds to that signal, and FIG. 23 is the reverse of FIG. 22 and is the case where an authentication signal is sent from the side of the use limiting apparatus 20 and the key 10 responds to that signal.

FIG. 22 will be described below.

The use limiting apparatus 20 receives a signal in which an authentication signal is sent from the key 10 to a mobile telephone in a period of a polling interval (=T1 seconds), and makes a determination of an identification code and a determination of a level of its received signal as described in FIG. 19. The received signal is a signal from my own key and responds to the key when a distance from the key is within a prescribed value.

Thereafter, the operation frequency detection part 215 checks an operation state of the terminal, with the result that when the polling interval Tp is changed from T1 to T2in the flow of FIG. 20, a response is made by including the contents to the effect that the polling interval Tp is changed to T2in a response signal to the key 10 after the use limiting apparatus 20 again receives a signal in which an authentication signal is sent from the key 10 to the use limiting apparatus 20 in a period of a polling interval (=T1seconds). The key 10 receiving its signal performs polling at the polling intervals T2 subsequently.

In the case of FIG. 23, the use limiting apparatus 20 rather than the key 10 sends an authentication signal, but a flow of an action for providing notification of a change in the polling interval Tp from the use limiting apparatus 20 and changing the polling interval is similar to that of FIG. 22.

Figure 24:
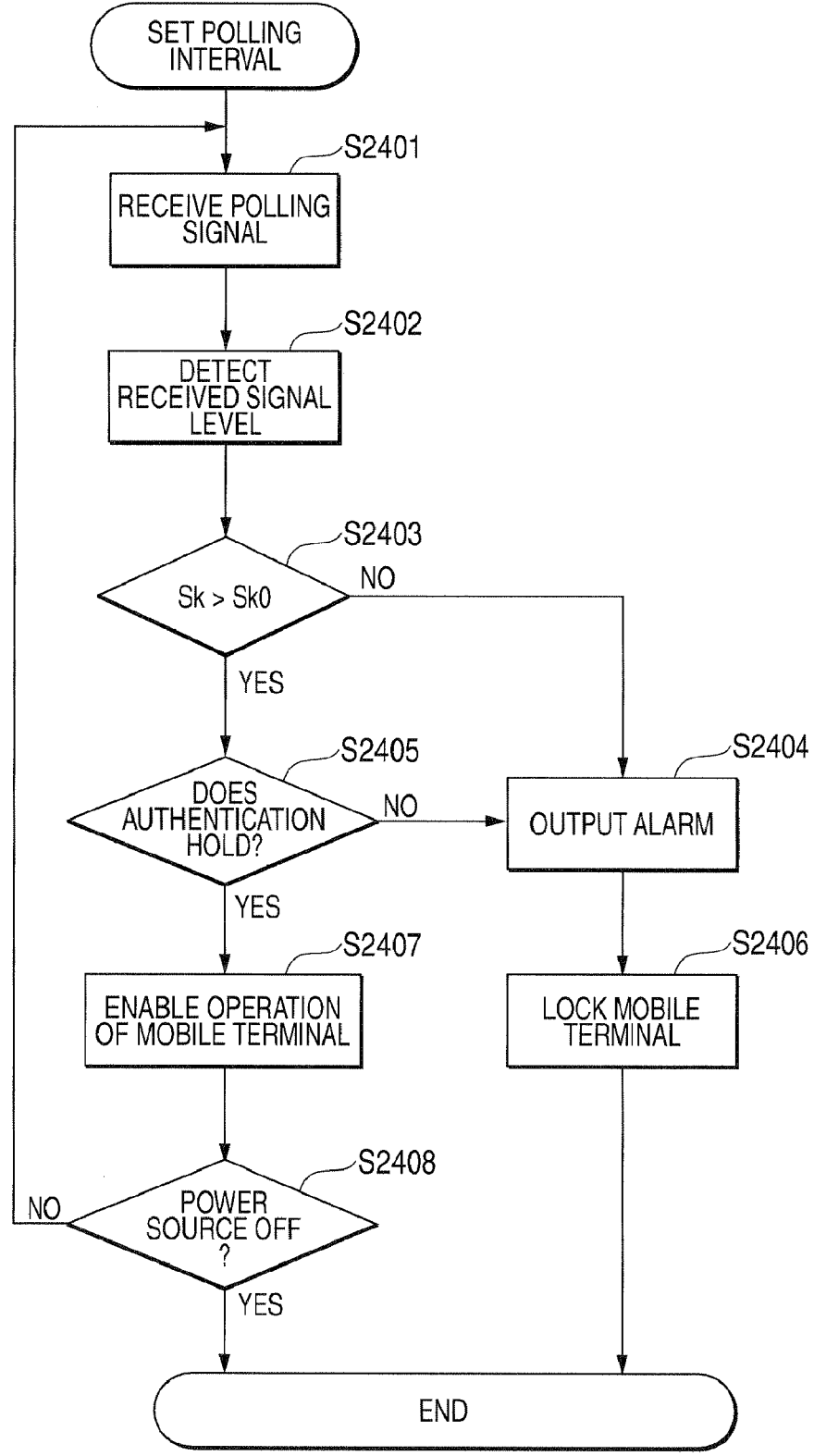
FIG. 24 is a diagram showing a function limiting action and an authentication action after a polling interval is set based on the flow of FIG. 20.

FIG. 24 is a diagram showing a function limiting action and an authentication action after a polling interval is set based on the flow of FIG. 20, and shows an action of the case of performing authentication by both of the key 10 and the use limiting apparatus 20. In this case, an authentication result is the same even when polling is performed from either.

The key 10 receives a polling signal sent from the use limiting apparatus 20 at a time interval Tp by the wireless part 130 (step S2401), and detects a received signal level Sk by the signal level detection part 108 (step S2402). Then, the authentication control part 113 is notified of the detected received signal level Sk and it is determined whether or not the received signal level Sk is larger than a prescribed value Sk0 (step S2403). When the received signal level Sk is smaller than the prescribed value Sk0 as a result of that, the authentication control part 113 drives the alarm circuit part 112 of the key 10 to output a warning signal (step S2404) and warns a user of the key 10 that the mobile telephone 1 is separate at a predetermined distance or longer.

On the other hand, when the received signal level Sk is larger than the prescribed value Sk0 as a result of the determination, the authentication control part 113 subsequently collates an identification code of the use limiting apparatus 20 included in a received signal with an identification code stored in the identification code memory 111 in the authentication control part 113 and determines whether or not the identification codes match (step S2405).

When the identification codes do not match as a result of the determination, a warning signal is outputted from the alarm circuit part 112 of the key 10 and the user of the key 10 is warned that the mobile telephone is not the mobile telephone 1 corresponding to the key 10 (step S2404).

On the other hand, when the identification codes match as a result of the authentication determination and authentication is performed, reception of a polling signal from the use limiting apparatus 20 of the mobile telephone 1 by the key 10 is continued unless a power source OFF button is pushed. When the power source OFF button is pushed, the present flow ends.

Also, the use limiting apparatus 20 receives a polling signal sent from the key 10 at a time interval Tp by the wireless part 230 (step S2401), and detects a received signal level Sk by the signal level detection part 208 (step S2402). Then, the authentication control part 225 is notified of the detected received signal level Sk and the authentication control part 225 determines whether or not the received signal level Sk is larger than a prescribed value Sk0 (step S2403). When the received signal level Sk is smaller than the prescribed value Sk0 as a result of that, the authentication control part 225 drives the alarm circuit part 212 of the use limiting apparatus 20 to output a warning signal (step S2404) and warns a user of the mobile telephone 1 that the key 10 is separate at a predetermined distance or longer and also, a use limiting signal is generated in the equipment use limiting signal generation part 219 and function limiting (lock) with respect to the mobile telephone 1 is performed (step S2406).

On the other hand, when the received signal level Sk is larger than the prescribed value Sk0 as a result of the determination, the authentication control part 225 subsequently collates an identification code of the key 10 included in a received signal with an identification code stored in the identification code memory 211 in the authentication control part 225 and determines whether or not the identification codes match (step S2405).

When the identification codes do not match as a result of the determination, the authentication control part 225 outputs a warning signal from the alarm circuit part 212 of the use limiting apparatus 20 and warns the user of the mobile telephone 1 that the mobile telephone is not the mobile telephone 1 corresponding to the key 10 and also, a use limiting signal is generated in the equipment use limiting signal generation part 219 and function limiting (lock) with respect to the mobile telephone 1 is performed (step S2406).

On the other hand, when the identification codes match as a result of the authentication determination and authentication is performed, the authentication control part 225 stops generation of a use limiting signal by the equipment use limiting signal generation part 219 and enables use of the mobile telephone 1 (step S2407). Reception of a polling signal from the key 10 by the use limiting apparatus 20 is continued unless a power source OFF button is pushed (step S2408). When the power source OFF button is pushed, the present flow ends.

Figure 25:
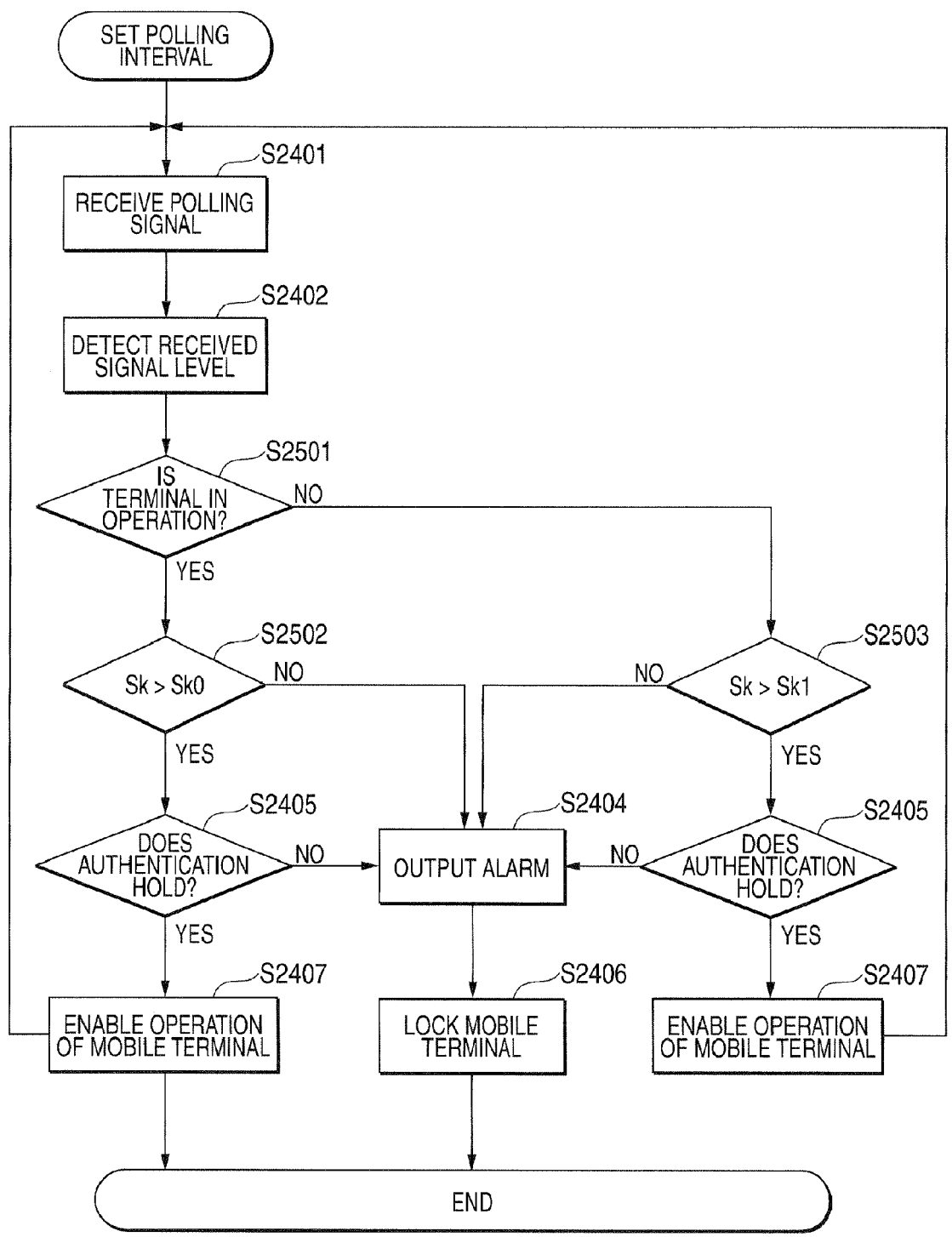
FIG. 25 is a flow of the case of changing a threshold value in FIG. 24 at the times of operation and non-operation.

FIG. 25 is a flow of the case of changing a threshold value in FIG. 24 to Sk0 and Sk1 at the times of operation and non-operation.

Thereafter, in parallel with execution of polling interval setting flow processing shown in FIG. 20 according to an operation state of the terminal, the use limiting apparatus 20 receives a polling signal sent from the key 10 at a time interval Tp by the wireless part 230 (step S2401) and detects a received signal level Sk by the signal level detection part 208 (step S2402).

In the use limiting apparatus 20, the polling interval control part 217 makes the operation frequency detection part 215 refer to the key input part 503 at intervals of a period Δt and determines whether or not the mobile telephone 1 is in operation (step S2501, the contents of processing are similar to processing of step S2004 in FIG. 20). After this, the authentication control part 225 notifies the key by, for example, including information as to whether or not the mobile telephone 1 is in operation of the terminal and information about a polling interval in a part of an authentication signal sent to the side of the key 10 after the polling interval is set.

Then, the authentication control part 225 notified of the detected received signal level Sk determines whether or not the received signal level Sk is larger than a prescribed value Sk0 when the mobile telephone 1 is in operation of the terminal in the processing of step S2501 (step S2502), and determines whether or not the received signal level Sk is larger than a prescribed value Sk1 when the mobile telephone 1 is not in operation of the terminal in the processing of step S2501 (step S2503).

When the received signal level Sk is smaller than the prescribed value (Sk0 when it is in operation of the terminal and Sk1 when it is not in operation) as a result of that, the authentication control part 225 drives the alarm circuit part 212 of the use limiting apparatus 20 to output a warning signal and warns a user of the mobile telephone 1 that the key 10 is separate at a predetermined distance or longer (step S2404) and also, a use limiting signal is generated in the equipment use limiting signal generation part 219 and function limiting (lock) with respect to the mobile telephone 1 is performed (step S2406).

On the other hand, when the received signal level Sk is larger than the prescribed value (Sk0 when it is in operation of the terminal and Sk1 when it is not in operation) as a result of the determination, the authentication control part 225 subsequently collates an identification code of the key 10 included in a received signal with an identification code stored in the identification code memory 211 and determines whether or not the identification codes match (step S2405).

When the identification codes do not match as a result of the determination, the authentication control part 225 outputs a warning signal from the alarm circuit part of the mobile telephone or the key and warns the user of the mobile telephone 1 that the key is not the key 10 corresponding to the mobile telephone 1 and also, a use limiting signal is generated in the equipment use limiting signal generation part 219 and function limiting (lock) with respect to the mobile telephone 1 is performed (step S2406).

On the other hand, when the identification codes match as a result of the authentication determination and authentication is performed, the authentication control part 225 stops generation of a use limiting signal by the equipment use limiting signal generation part 219 and enables use of the mobile telephone 1. Reception of a polling signal from the key 10 by the use limiting apparatus 20 is continued unless a power source OFF button is pushed. When the power source OFF button is pushed, the present flow ends.

Also, the key 10 receives a polling signal sent from the use limiting apparatus 20 by the wireless part 130 (step S2401), and detects a received signal level Sk by the signal level detection part 108 (step S2402). Further, the authentication control part 113 acquires information included in the received polling signal, the information as to whether or not the mobile telephone 1 is in operation of the terminal, and sets a prescribed value used as a threshold value of the received signal level Sk to Sk0 or Sk1 according to its information (step S2501).

The authentication control part 113 notified of the received signal level Sk from the signal level detection part 108 determines whether or not the received signal level Sk is larger than the prescribed value (Sk0 when the mobile telephone 1 is in operation of the terminal (step S2502) and Sk1 when the mobile telephone 1 is not in operation (step S2503)). When the received signal level Sk is smaller than the prescribed value (Sk0 when it is in operation of the terminal and Sk1 when it is not in operation) as a result of that, the alarm circuit part 112 of the key 10 is driven to output a warning signal and a user of the key 10 is warned that the mobile telephone 1 is separate at a predetermined distance or longer (step S2404) and also, a use limiting signal is generated in the equipment use limiting signal generation part 219 and function limiting (lock) with respect to the mobile telephone 1 is performed (step S2406).

On the other hand, when the received signal level Sk is larger than the prescribed value (Sk0 when it is in operation of the terminal and Sk1 when it is not in operation) as a result of the determination, the authentication control part 113 subsequently collates an identification code of the use limiting apparatus 20 included in a received signal with an identification code stored in the identification code memory 111 and determines whether or not the identification codes match (step S2405).

When the identification codes do not match as a result of the determination, the authentication control part 113 outputs a warning signal from the alarm circuit part 112 of the key 10 and warns the user of the key 10 that the mobile telephone is not the mobile telephone 1 corresponding to the key 10 and also, a use limiting signal is generated in the equipment use limiting signal generation part 219 and function limiting (lock) with respect to the mobile telephone 1 is performed (step S2406).

On the other hand, when the identification codes match as a result of the authentication determination and authentication is performed, the authentication control part 113 enables use of the mobile telephone 1 (step S2406). Reception of a polling signal from the use limiting apparatus by the key 10 is continued unless a power source OFF button is pushed. When the power source OFF button is pushed, the present flow ends.

Here, for T2>T3>T4>T5, an authentication interval during a key operation is made longer than that of the case of non-operation. Then, since the fact that a key operation of the mobile telephone 1 can be performed means that mutual authentication already holds at that point in time, a user of the mobile terminal 1 can decide that the said person is operating, so that even when an authentication interval during the key operation is made longer than that of the case of non-operation, a security level is not decreased and a life of a battery can be increased.

Further, when a user again attempts to use a mobile telephone from a state in which the mobile telephone is not used once, an authentication interval is short in the case of no use, so that the user of the mobile telephone 1 can again use the mobile telephone 1 without waiting too much.

Description will be made by a concrete example. For example, it is assumed that settings of T1=T2=15 seconds and T5=1 second are made, authentication is performed at intervals of 15 seconds in the case of use of the mobile telephone 1 and authentication is performed at intervals of 1 second in the case of no use. As a result of that, when a user who has stopped use once attempts to make use again, only 1 second is taken as an authentication interval, so that the wait time taken to reach a state in which the mobile telephone 1 can be again used since mutual authentication held becomes about 1 second and it is unnecessary to wait too much by the time when the mobile telephone 1 can be used.

Consequently, power consumption of the mobile telephone 1 can be reduced as compared with the case of performing polling at the same intervals always. Further, since the fact that a key operation of the mobile telephone 1 can be performed means that mutual authentication already holds at that point in time, a user of the mobile terminal 1 can decide that the said person is operating, so that even when an authentication interval during the key operation is made longer than that of the case of non-operation, a security level is not decreased and a life of a battery can be increased and further usability of the user can be improved.

In addition, in the embodiment, as polling, it can also be constructed so that identification codes unique to the key 10 and the use limiting apparatus 20 are only sent and received respectively, and it can also be constructed so that after the key 10 sends an identification code unique to the key 10 and the use limiting apparatus 20 receives the identification code unique to the key 10, random numbers (challenge signal) are sent to the key 10 and an answer signal (response signal) to this is received and when it can be checked that the answer signal (response signal) is an answer signal from the key 10 paired, an identification code unique to the use limiting apparatus 20 is sent and a signal for releasing use limiting is outputted from the equipment use limiting signal generation part 219, or when it cannot be checked that the answer signal (response signal) is the answer signal, a signal for limiting use is outputted. Meaning of this polling is similar in other embodiments.

(Supplements to First to Ninth Embodiments)

Figure 6:
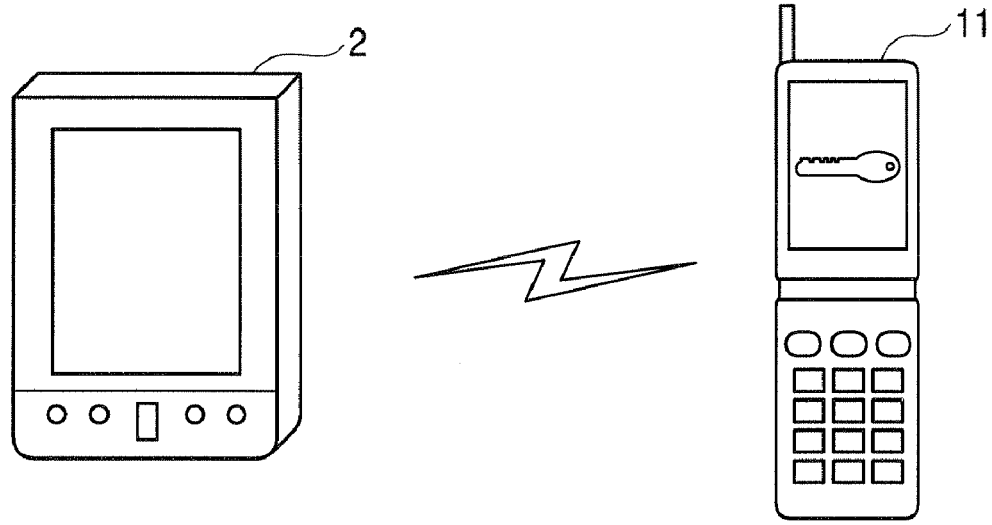
FIG. 6(*a*) is a diagram showing an outline configuration in a use limiting system of a PDA according to the first embodiment.
Figure 6:
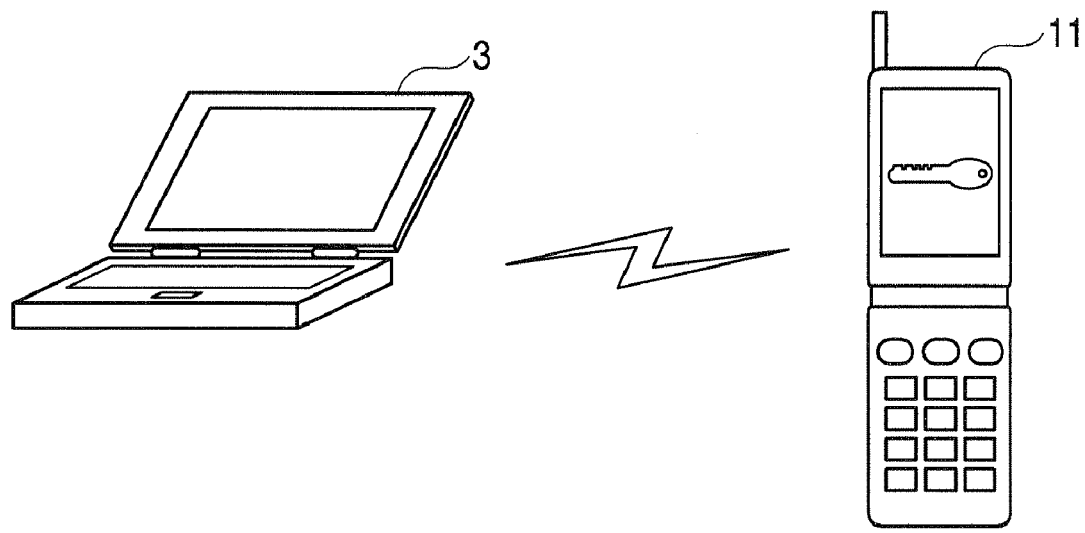
Figure 15:
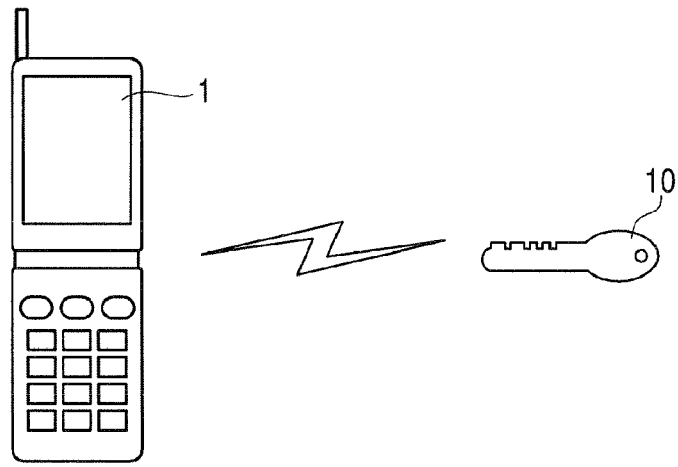
FIG. 15(a) is a diagram showing an outline configuration of a use limiting system of a mobile telephone in the embodiment of the invention.
FIG. 15(b) is a diagram showing an outline configuration of a use limiting system of a PDA in the embodiment of the invention.
FIG. 15(c) is a diagram showing an outline configuration of a use limiting system of a personal computer in the embodiment of the invention.
Figure 15:
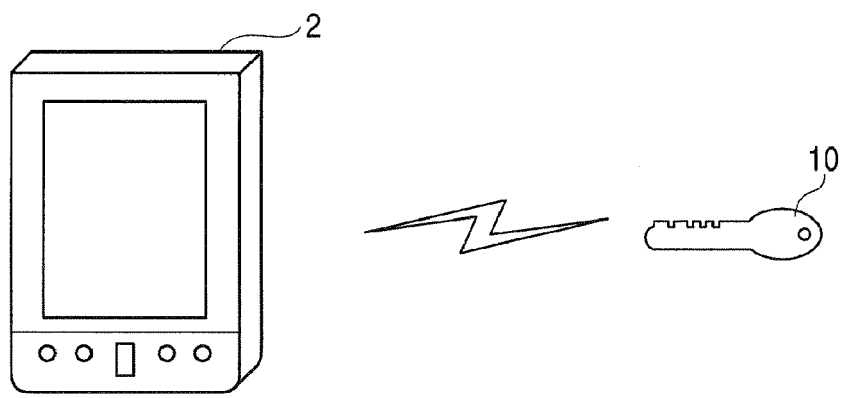
Figure 15:
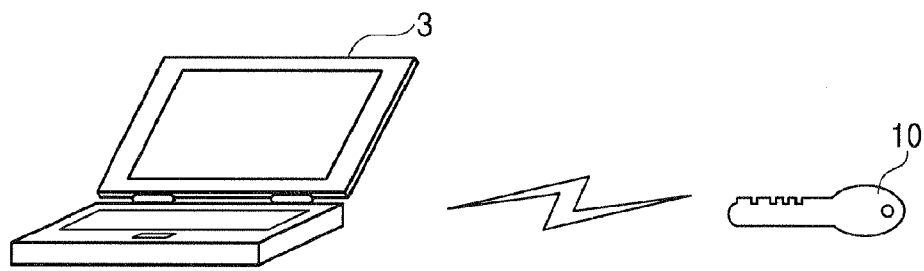

In addition, in the first to ninth embodiments described above, as electronic equipment for limiting the use in the case of theft or loss, the mobile telephone has been illustrated as shown in FIG. 15(a), but as the limiting electronic equipment, equipment such as a PDA 2 or a personal computer 3 may be used as shown in FIGS. 15(b) and 15(c). Also, as shown in FIGS. 6(a) and 6(b), a use limiting apparatus is built into the PDA 2 or the personal computer 3 and polling is respectively performed between the use limiting apparatus and a mobile telephone 11 having a function of a key and the use can be limited in the case of theft or loss of the PDA 2 or the personal computer 3. Further, it goes without saying that the invention can be similarly applied to a keyless system of a money safe, an automobile, a portable music player or a game machine (not shown).

Also, in the embodiments, as a communication medium for performing polling, UWB wireless, wireless radio waves, etc. for short-range communication used in RFID have been illustrated, but acoustic communication of ultrasonic waves etc. or infrared communication by IrDA etc. can also be used in addition to these radio waves.

In the first to eighth embodiments described above, the timer (2) and the timer (3) have been described distinctly, but control of polling or authentication processing may be performed by using one timer and calculating the necessary time.

Also, in the first to ninth embodiments described above, the operation frequency detection part 215 has decided whether or not the mobile telephone is in operation by periodically check the presence or absence of a key input, but it may make a decision by including whether or not a telephone call function or a communication function is used in addition to the presence or absence of the key input.

In this case, the operation frequency detection part 215 could be replaced with a terminal use check part for checking whether or not a terminal is used, and the key input time storage part 214 could be replaced with a terminal use time storage part for storing the time deciding that a terminal is used.

Also, in a mobile telephone of a folding type (for example, P700i in NTT DoCoMo, Inc.), a slide type (for example, D253i in NTT DoCoMo, Inc.) or a rotation type (for example, P506iC in NTT DoCoMo, Inc.), it may be decided whether or not the mobile telephone is in operation by periodically making a check including an opening and closing operation of a liquid crystal part of the mobile telephone as well as a key input.

Also, in the first to ninth embodiments described above, the description has been made using T2>T3>T4>T5, but T2<T3<T4<T5 may be used. For T2>T3>T4>T5, a polling interval becomes longer as a mobile telephone is frequently used, so that there is an effect of reducing power consumption when a user frequently uses the mobile telephone. For T2<T3<T4<T5, a polling interval becomes longer as time for which the mobile telephone is not operated is longer, so that there is an effect of reducing power consumption when a user does not use the mobile telephone too frequently.

Also, a user may select either case by operating the mobile telephone.

Also, in the first to ninth embodiments described above, the case where the equipment use limiting signal generation part 219 outputs a use limiting release signal according to a compared result of a reception level has been described, but it is not limited to the signal output and, for example, it may be constructed so as to execute enabling or disabling of use of a mobile telephone by outputting or stopping a use limiting permission signal or a use limiting signal or a use limiting release signal.

Also, the first to ninth embodiments described above may be combined and implemented.

The invention has been described in detail with reference to particular embodiments, but it is apparent to those skilled in the art that various changes and modifications can be made without departing from the spirit and scope of the invention.

The present application is based on Japanese Patent Application (No. 2005-125156) filed on Apr. 22, 2005, the contents of which are incorporated herein by reference.

INDUSTRIAL APPLICABILITY

A use limiting apparatus, a key and a use limiting system of the invention have an effect capable of providing a key, a use limiting apparatus and an equipment use limiting system capable of suppressing power consumption while preventing unauthorized use by other people by limiting the use in the case of theft or loss of equipment, and are useful for an information processing apparatus and a communication apparatus of a mobile telephone, a PDA, a personal computer, etc.

The invention claimed is:

1. An electronic equipment configured to limit use thereof and to release limit of the use thereof based on sending and receiving of an authentication signal to and from a key that is apart from the electronic equipment, comprising:
a sending and receiving part configured to send and receive the authentication signal to and from the key;
a signal level detection part configured to detect a signal level of a radio wave including the authentication signal, which is received from the key by the sending and receiving part;
an authentication control part configured to determine whether or not the signal level detected by the signal level detection part is equal to or greater than a threshold value,
an operation detection part configured to detect whether or not the electronic equipment is in operation; and
an equipment use limiting signal generation part configured to generate an equipment use limiting signal for either limiting use of the electronic equipment, or releasing its limit, according to a result of determination by the authentication control part,
wherein the authentication control part is further configured to change the threshold value according to whether or not the electronic equipment is in operation, which is detected by the operation detection part.

2. The electronic equipment according to claim 1, wherein the equipment use limiting signal generation part is further configured to generate an equipment use limiting signal for limiting use of the electronic equipment when the signal level detected by the signal level detection part is less than the threshold value.

3. The electronic equipment according to claim 1, wherein the authentication control part is further configured to determine whether or not a particular identification code is included in the authentication signal, and
the equipment use limiting signal generation part is further configured to generate an equipment use limiting signal for limiting use of the electronic equipment when the authentication control part determines that the particular identification code is not included in the case where the signal level detected by the signal level detection part is equal to or greater than the threshold value.

4. The electronic equipment according to claim 1, wherein
the authentication control part is further configured to
determine whether or not a particular identification code
is included in the authentication signal, and
the equipment use limiting signal generation part is further configured to stop generating an equipment use limiting signal for limiting use of the electronic equipment, to thereby release limit of use of the electronic equipment, when the authentication control part determines that the particular identification code is included in the case where the signal level detected by the signal level detection part is equal to or greater than the threshold value.

5. The electronic equipment according to claim 1, wherein the operation detection part is configured to detect whether or not the electronic equipment is in operation based on one or more of: (a) a key input to the electronic equipment, (b) a communication function of the electronic equipment, and (c) opening and closing of a cover part of the electronic equipment.

6. The electronic equipment according to claim 1, wherein the electronic equipment is a mobile telephone.

7. A use limiting apparatus annexed to an electronic equipment, comprising:
a sending and receiving part configured to send and receive an authentication signal to and from a key that is apart from the electronic equipment;
a signal level detection part configured to detect a signal level of a radio wave including the authentication signal, which is received from the key by the sending and receiving part;
an authentication control part configured to determine whether or not the signal level detected by the signal level detection part is equal to or greater than a threshold value;
an operation detection part configured to detect whether or not the electronic equipment is in operation; and
an equipment use limiting signal generation part configured to generate an equipment use limiting signal for either limiting use of the electronic equipment, or releasing its limit, according to a result of determination by the authentication control part,
wherein the authentication control part is further configured to change the threshold value according to whether or not the electronic equipment is in operation, which is detected by the operation detection part.

8. The use limiting apparatus according to claim 7, wherein the equipment use limiting signal generation part is further configured to generate an equipment use limiting signal for limiting use of the electronic equipment when the signal level detected by the signal level detection part is less than the threshold value.

9. The use limiting apparatus according to claim 7, wherein
the authentication control part is further configured to determine whether or not a particular identification code is included in the authentication signal, and
the equipment use limiting signal generation part is further configured to generate an equipment use limiting signal for limiting use of the electronic equipment when the authentication control part determines that the particular identification code is not included in the case where the signal level detected by the signal level detection part is equal to or greater than the threshold value.

10. The use limiting apparatus according to claim 7, wherein
the authentication control part is further configured to determine whether or not a particular identification code is included in the authentication signal, and
the equipment use limiting signal generation part is further configured to stop generating an equipment use limiting signal for limiting use of the electronic equipment, to thereby release limit of use of the electronic equipment, when the authentication control part determines that the particular identification code is included in the case where the signal level detected by the signal level detection part is equal to or greater than the threshold value.

11. The use limiting apparatus according to claim 7, wherein the operation detection part is configured to detect whether or not the electronic equipment is in operation based on one or more of: (a) a key input to the electronic equipment, (b) a communication function of the electronic equipment, and (c) opening and closing of a cover part of the electronic equipment.

12. The use limiting apparatus according to claim 7, wherein the electronic equipment is a mobile telephone.

13. A key for issuing a warning regarding unauthorized attempt to use an electronic equipment that is apart from the key, based on sending and receiving of an authentication signal to and from a use limiting apparatus annexed to the electronic equipment, comprising:
a sending and receiving part configured to send and receive the authentication signal to and from the use limiting apparatus;
a signal level detection part configured to detect a signal level of a radio wave including the authentication signal, which is received from the use limiting apparatus by the sending and receiving part;
an authentication control part configured to determine whether or not the signal level detected by the signal level detection part is equal to or greater than a threshold value; and
an alarm circuit part configured to generate a warning signal according to a result of determination by the authentication control part,
wherein the authentication control part is further configured to change the threshold value according to whether or not the electronic equipment is in operation, which is reported from the use limiting apparatus.

14. The key according to claim 13, wherein the alarm circuit part is further configured to generate the warning signal when the signal level detected by the signal level detection part is less than the threshold value.

15. The key according to claim 13, wherein
the authentication control part is further configured to determine whether or not a particular identification code is included in the authentication signal, and
the alarm circuit part is further configured to generate the warning signal when the authentication control part determines that the particular identification code is not included in the case where the signal level detected by the signal level detection part is equal to or greater than the threshold value.

16. The key according to claim 13, wherein the electronic equipment is a mobile telephone.

* * * * *